H. HANSON.
COMBINED TYPE WRITING AND COMPUTING MACHINE.
APPLICATION FILED SEPT. 18, 1913.
1,282,820.
Patented Oct. 29, 1918.
12 SHEETS—SHEET 1.
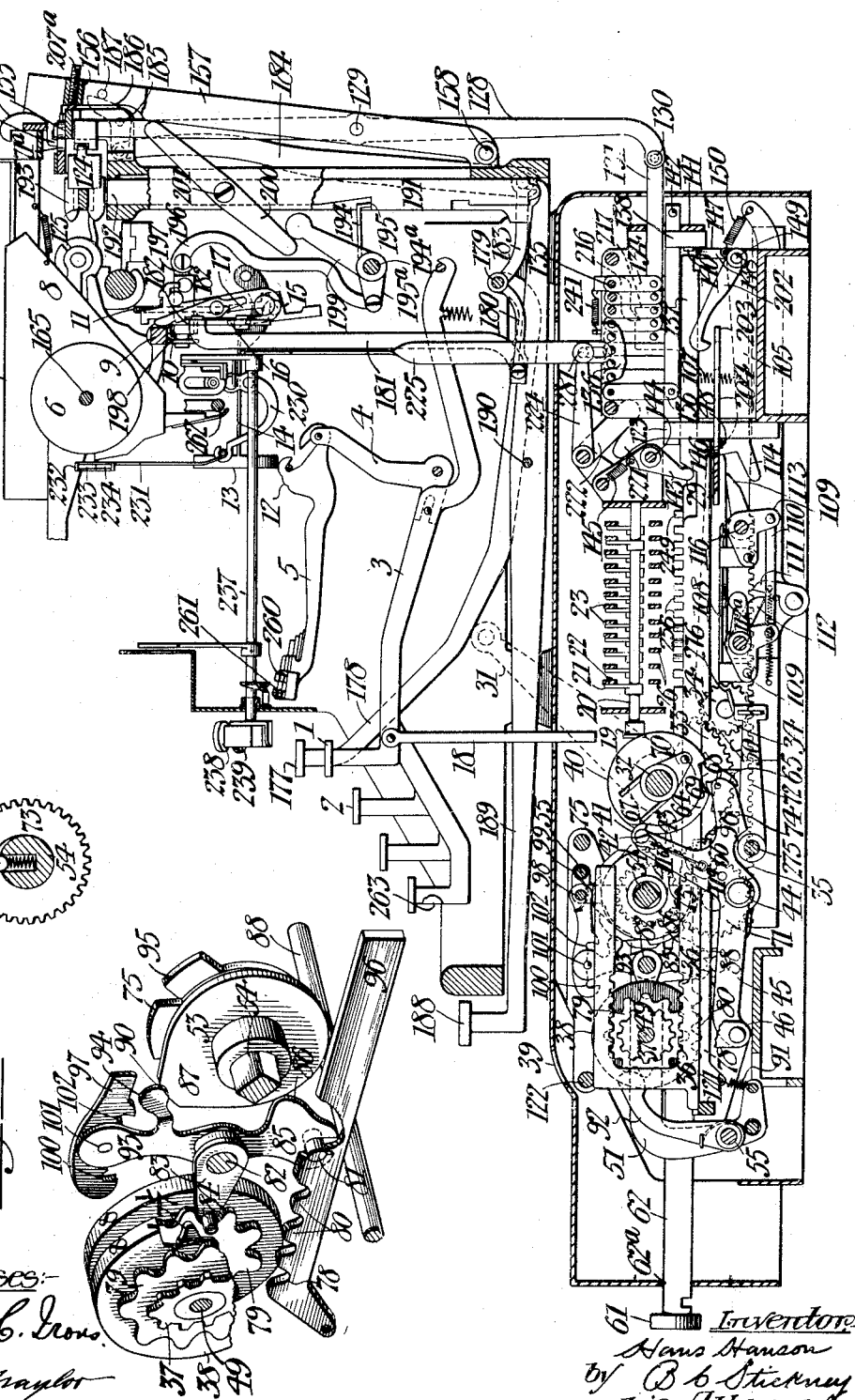
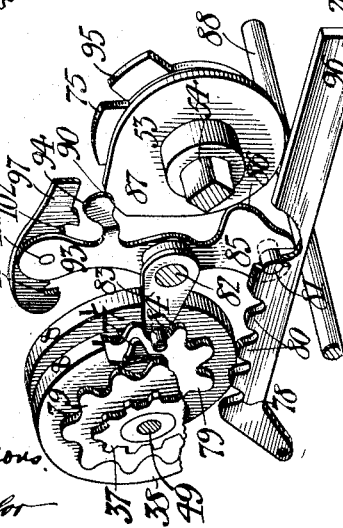

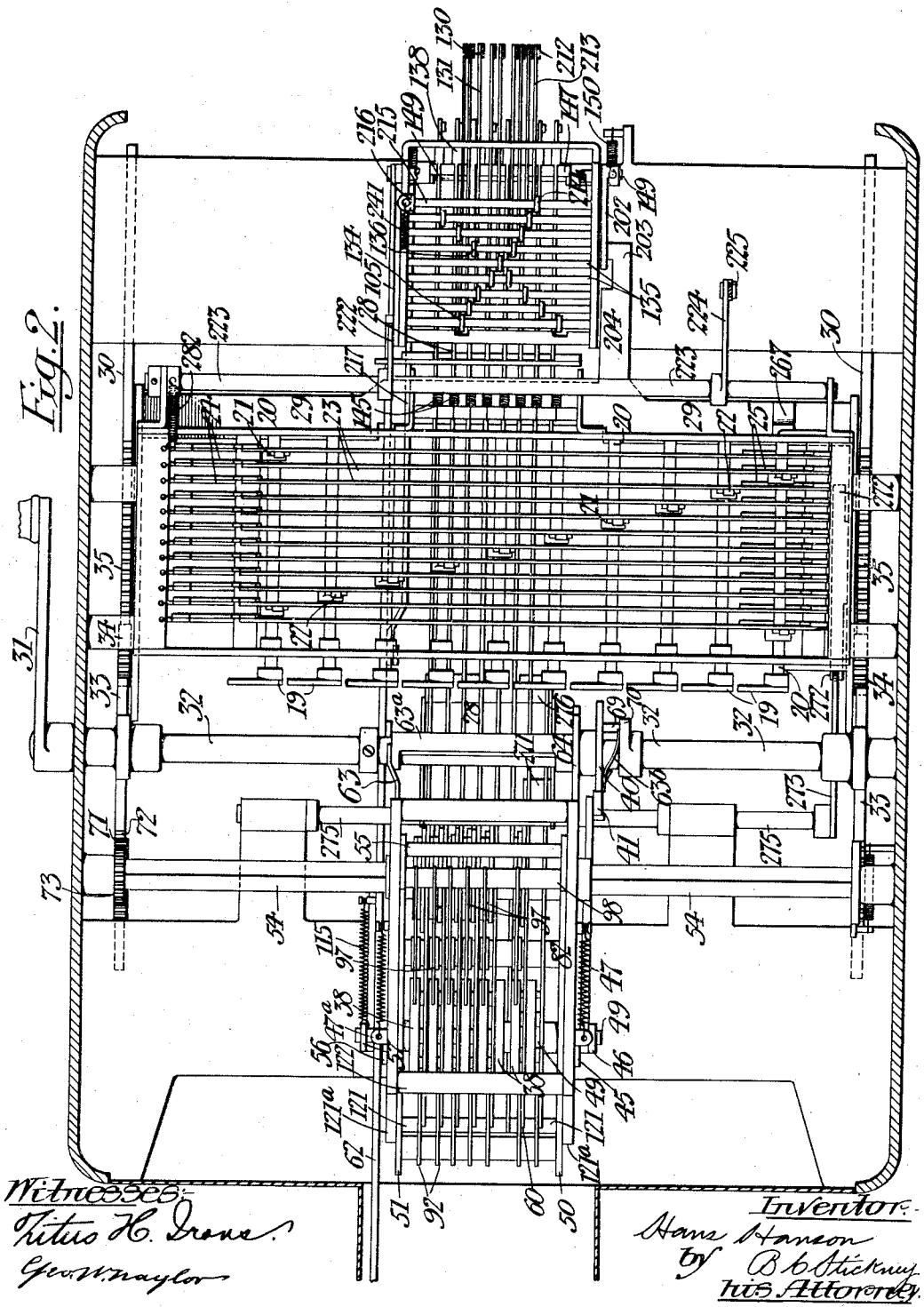

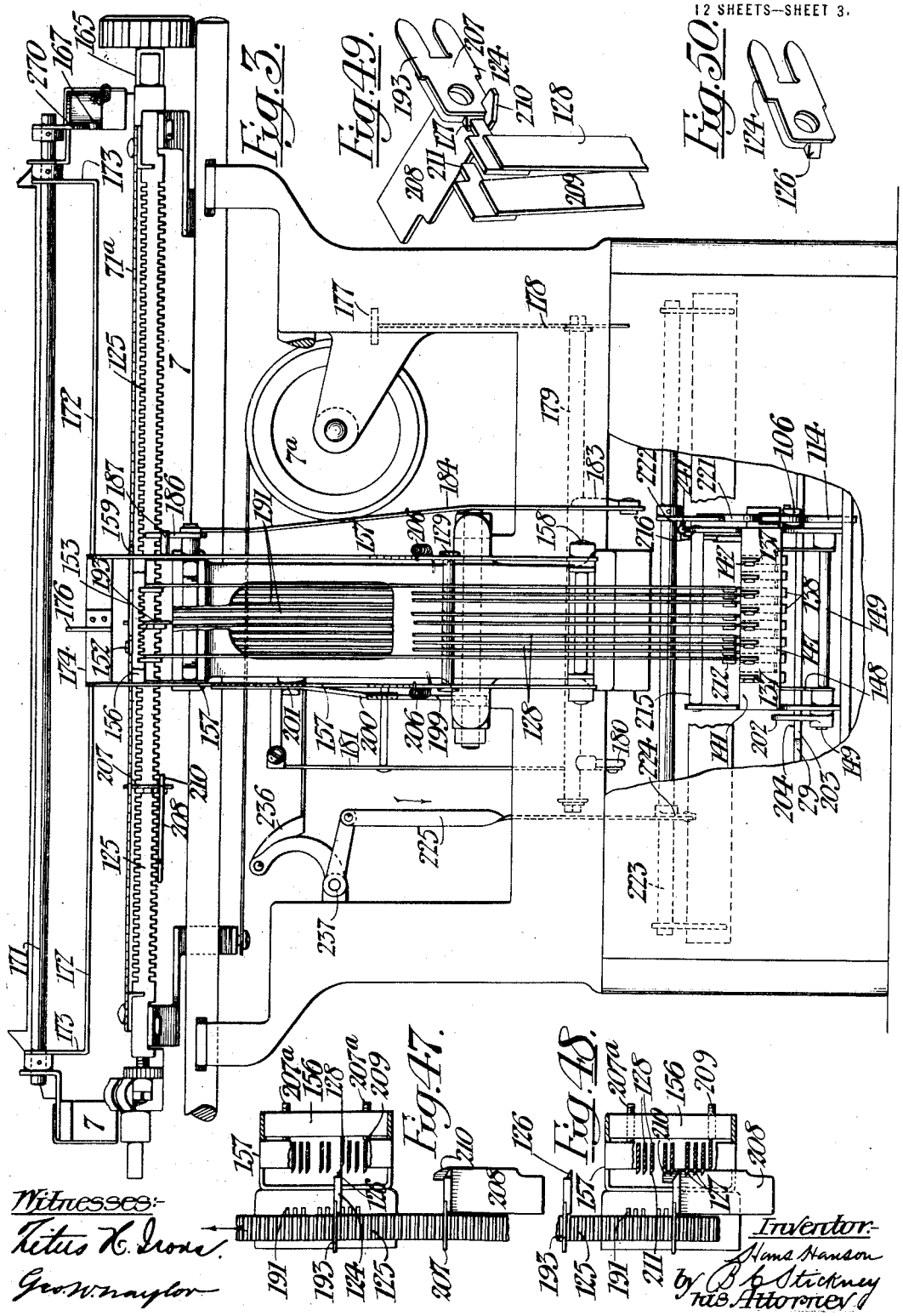

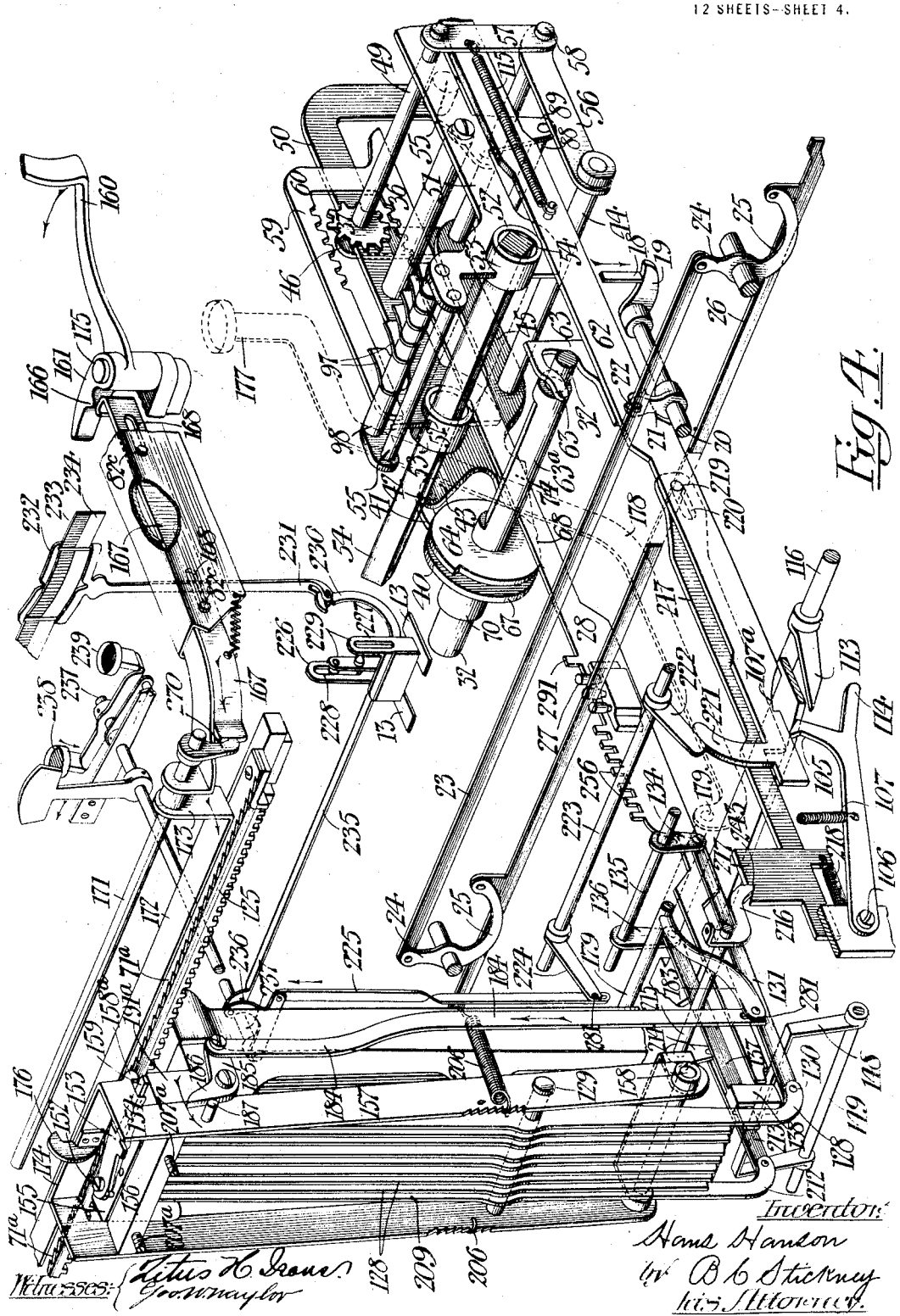

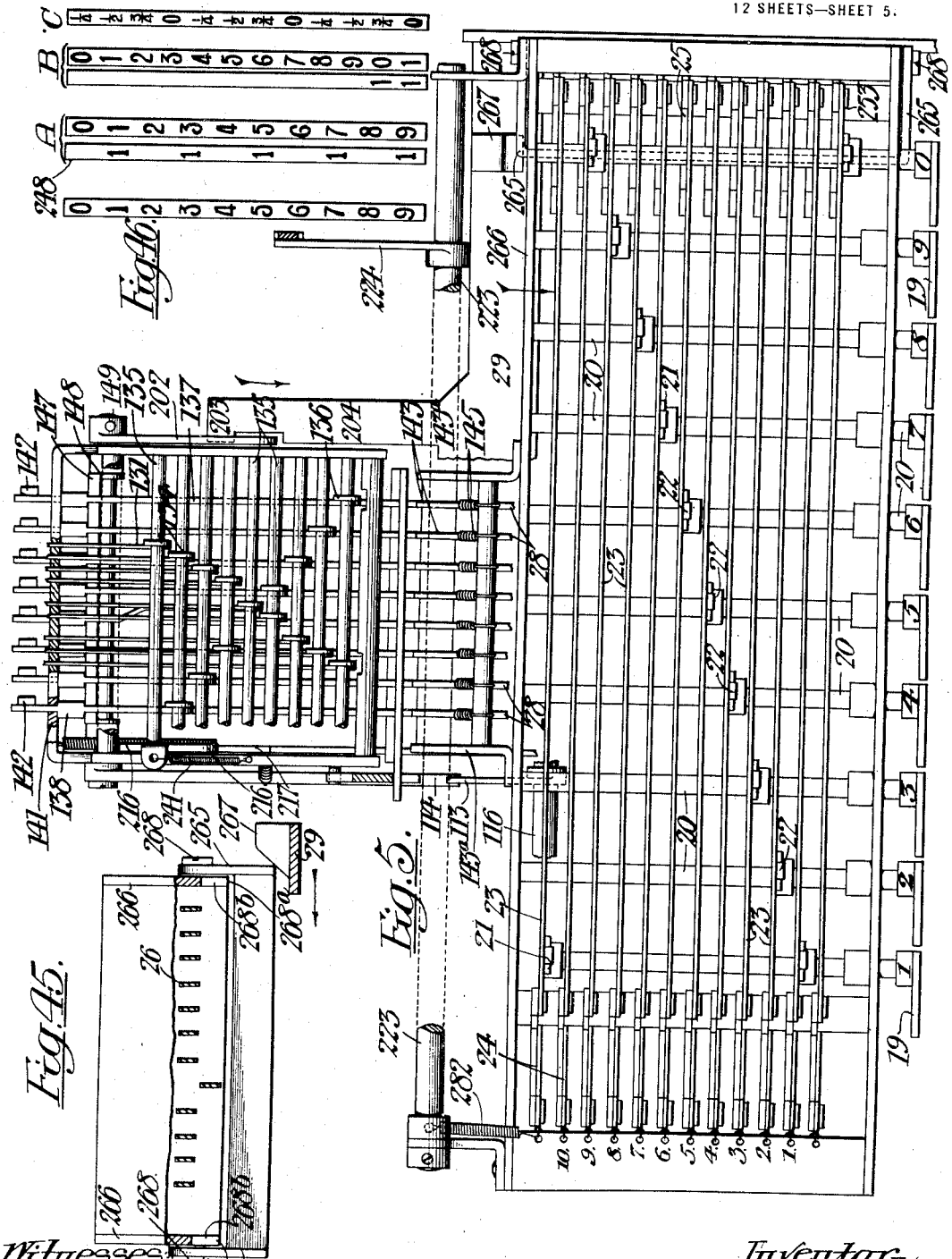

H. HANSON.
COMBINED TYPE WRITING AND COMPUTING MACHINE.
APPLICATION FILED SEPT. 18, 1913.
1,282,820.
Patented Oct. 29, 1918.
12 SHEETS—SHEET 6.
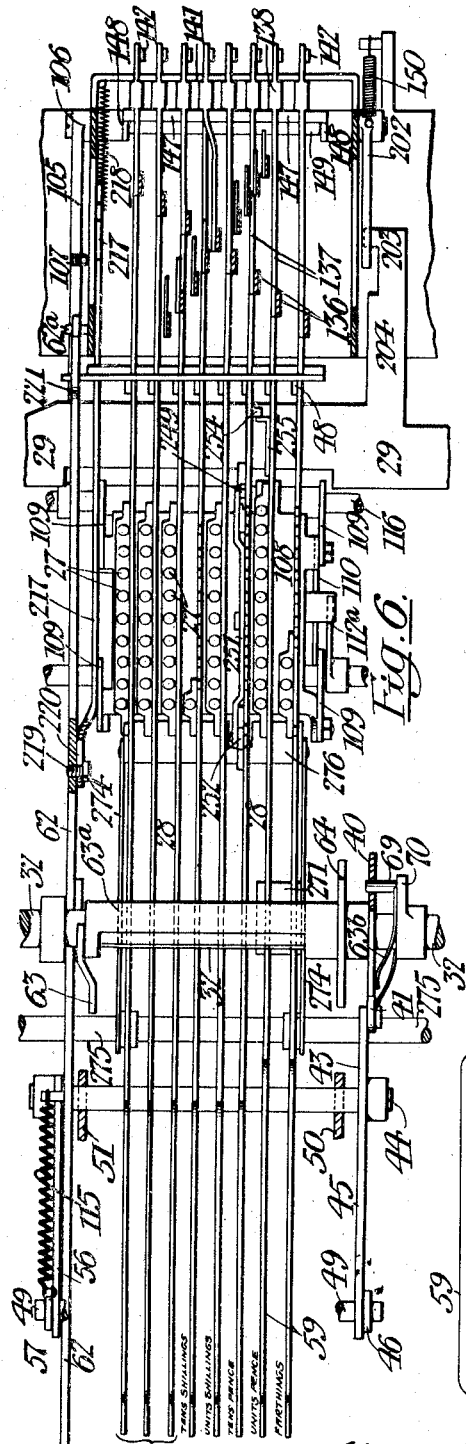
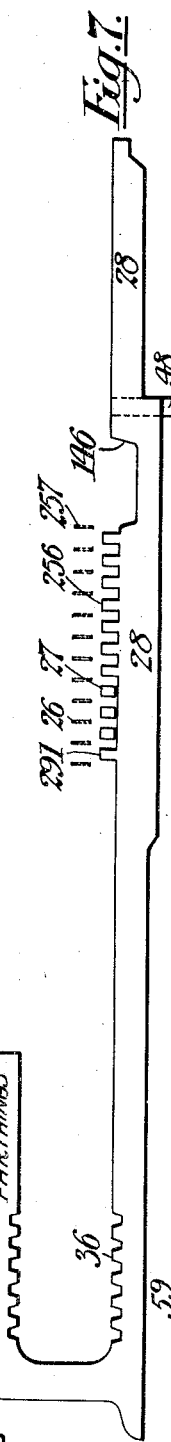
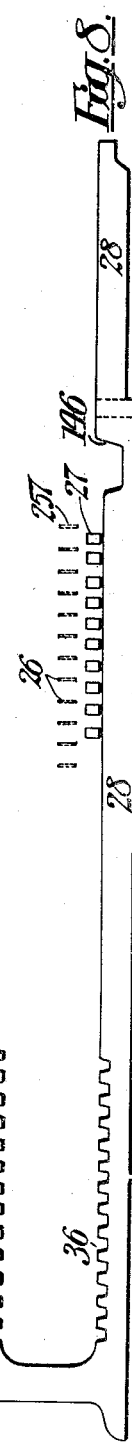
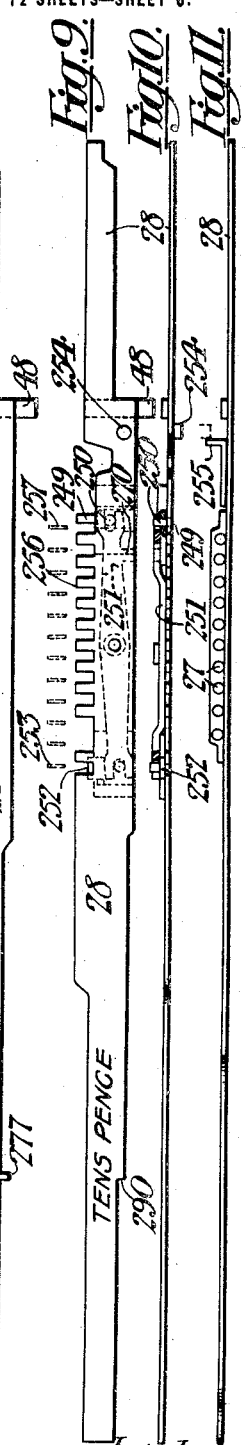

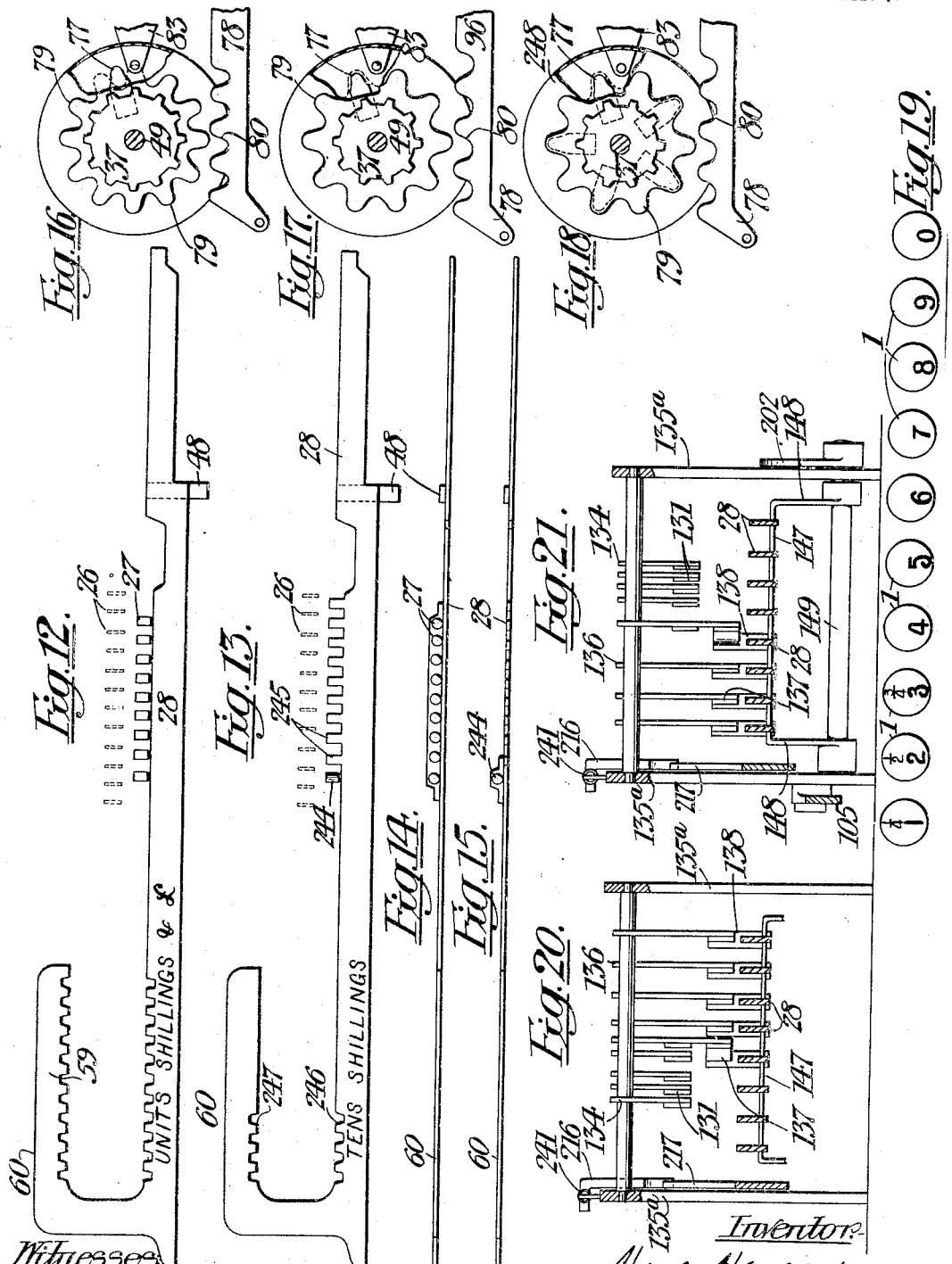

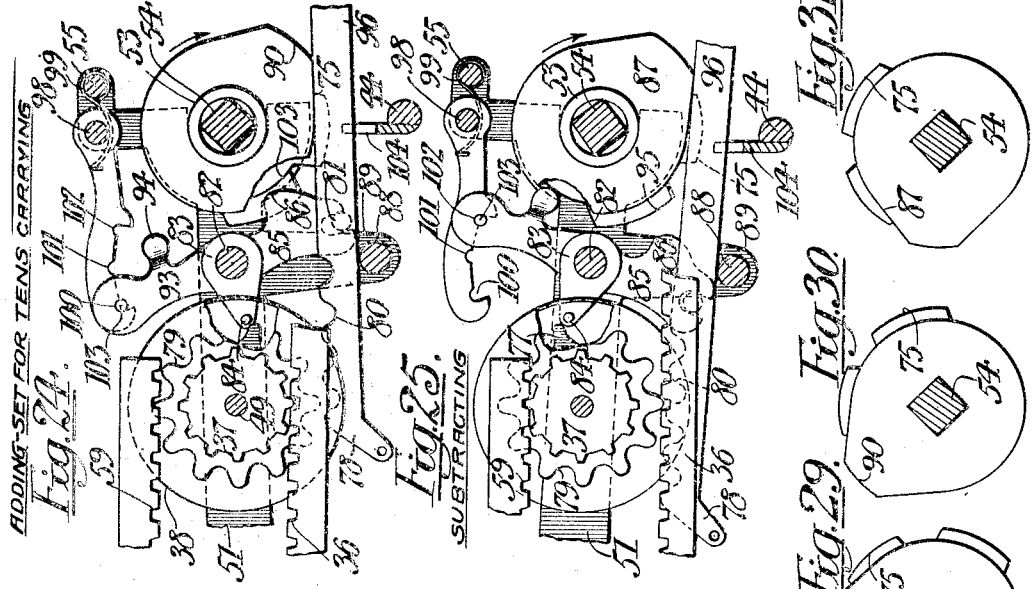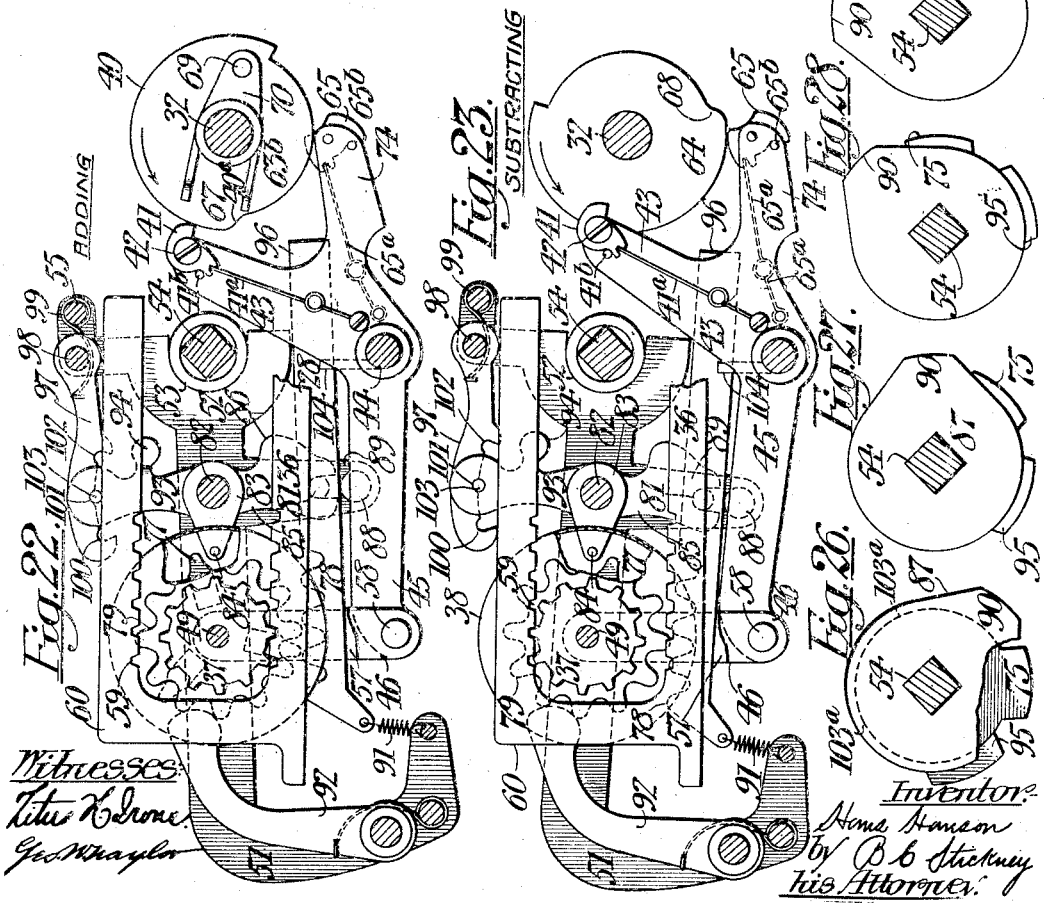

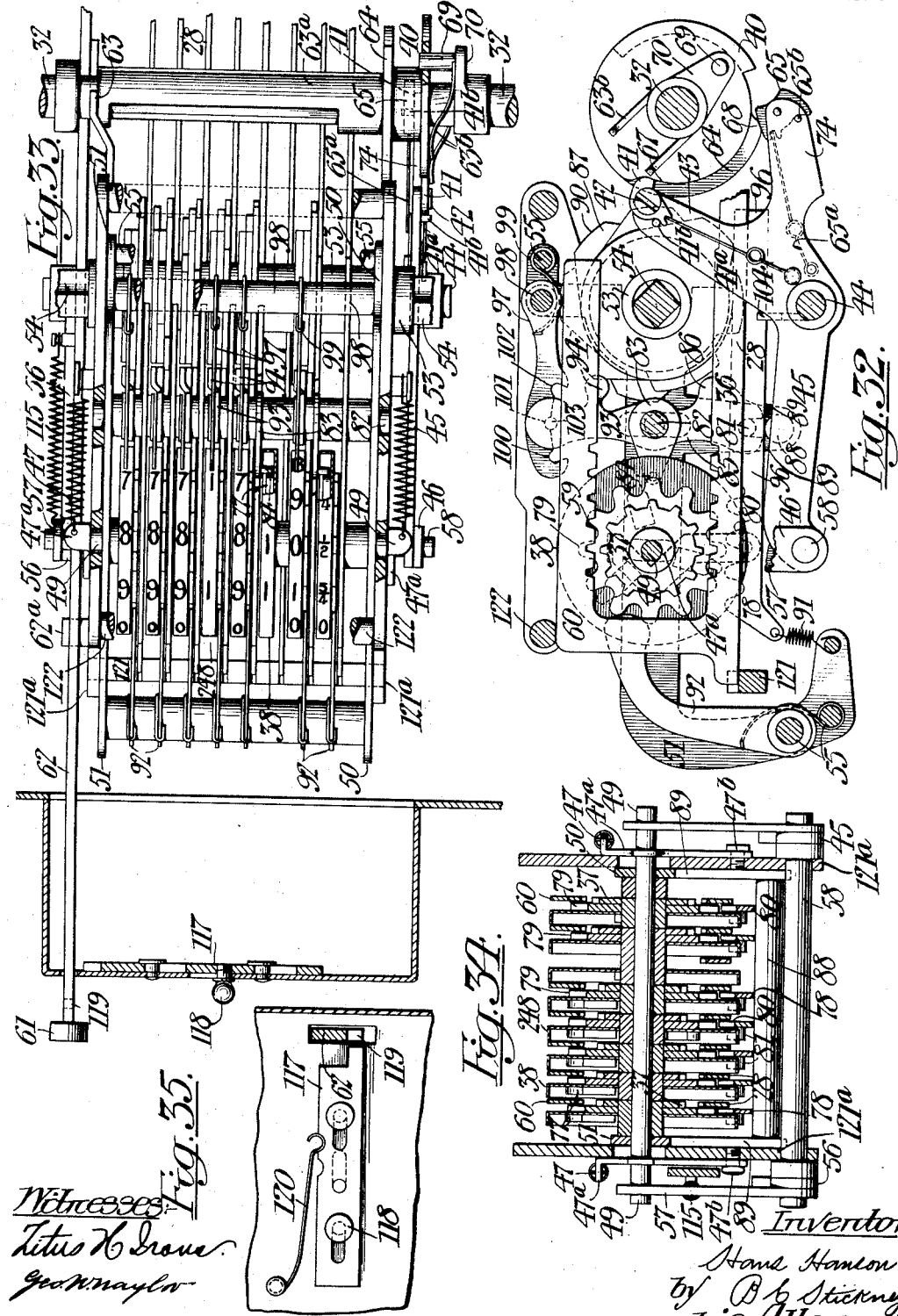

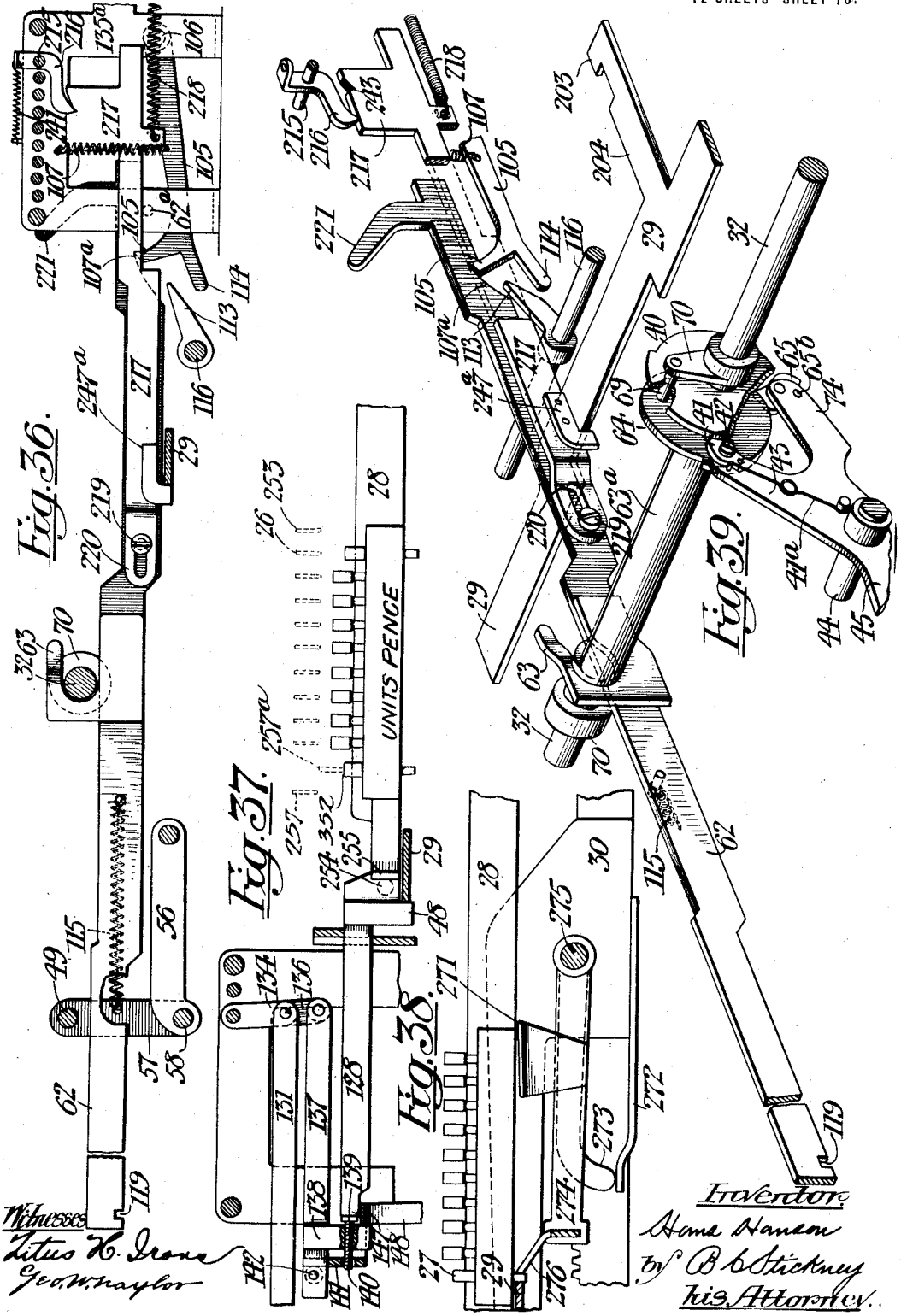

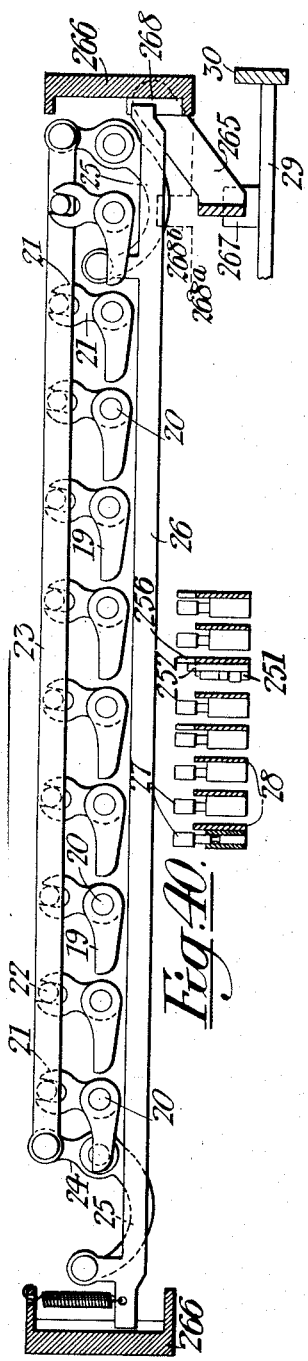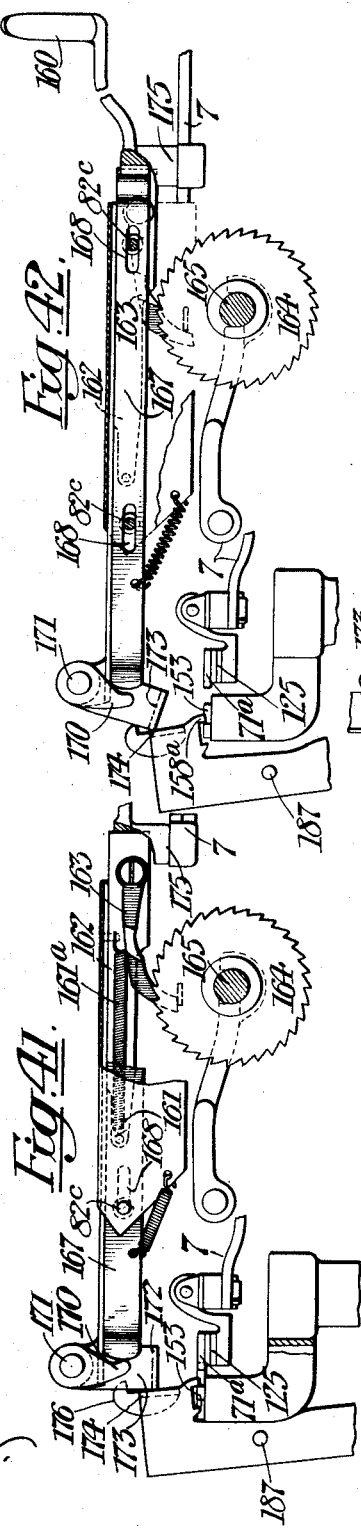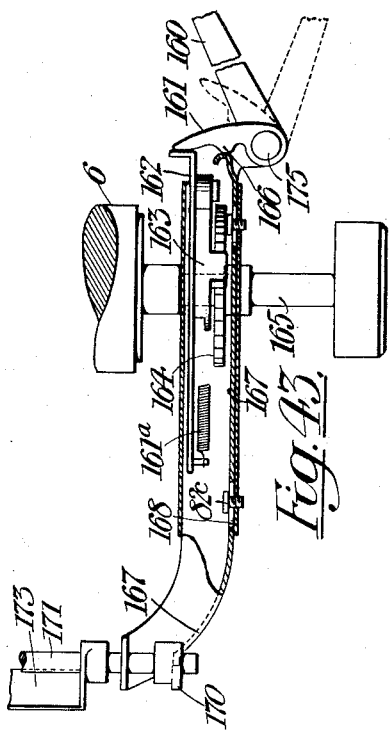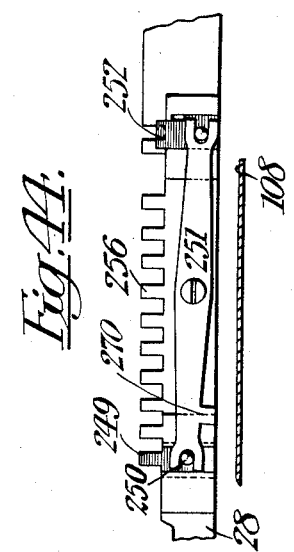

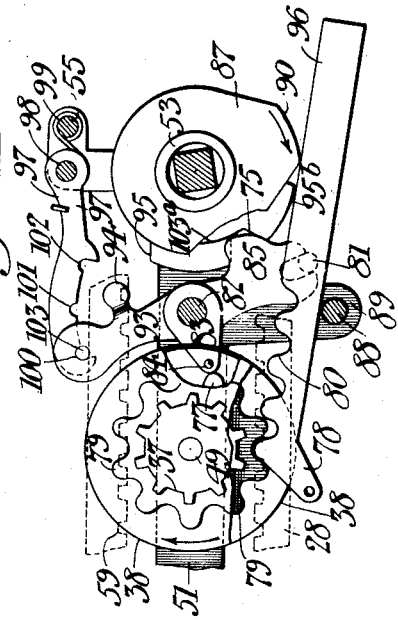
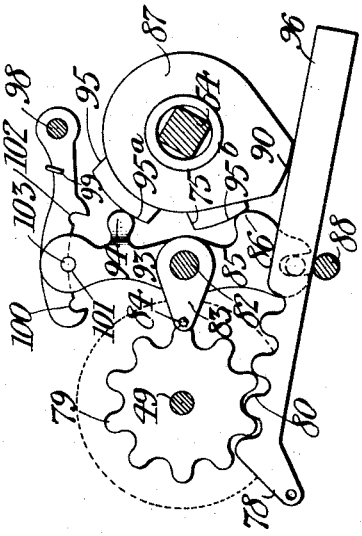
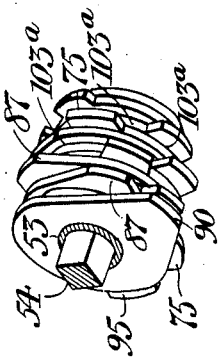
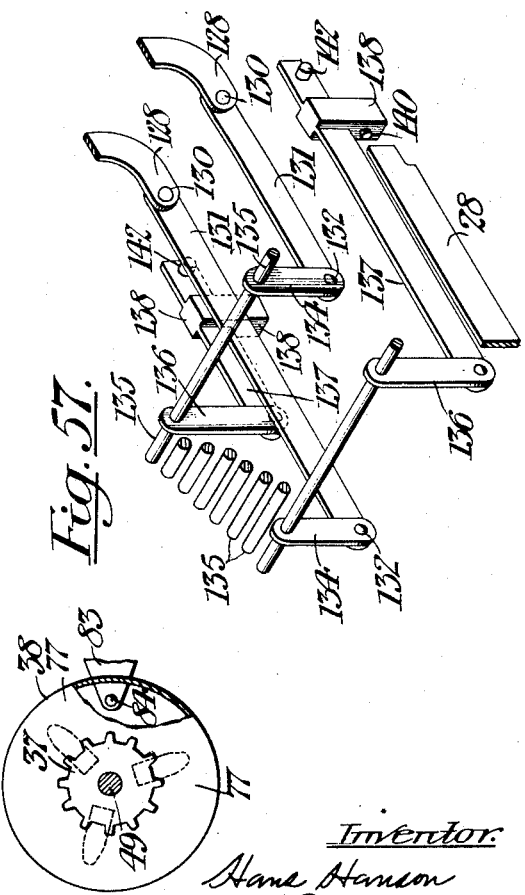

UNITED STATES PATENT OFFICE.

HANS HANSON, OF HARTFORD, CONNECTICUT, ASSIGNOR, BY MESNE ASSIGNMENTS, TO UNDERWOOD COMPUTING MACHINE COMPANY, OF NEW YORK, N. Y., A CORPORATION OF NEW YORK.

COMBINED TYPE-WRITING AND COMPUTING MACHINE.

1,282,820.  Specification of Letters Patent.  Patented Oct. 29, 1918.

Application filed September 18, 1913. Serial No. 790,453.

*To all whom it may concern:*

Be it known that I, HANS HANSON, a citizen of the United States, residing in Hartford, in the county of Hartford and State of Connecticut, have invented certain new and useful Improvements in Combined Type-Writing and Computing Machines, of which the following is a specification.

My invention relates to computing machines and is herein disclosed in large part as an improvement on my Patent No. 905,421, dated December 1, 1908. Said patent discloses a combined typewriting and computing machine wherein the numeral keys of the typewriter set up on computation members equivalents of numbers to be carried into computing wheels, said computing wheels forming a totalizer or computing head.

In said patent the typewriting machine shown is of the usual Underwood type, and the carriage of the typewriter as it travels along selects *seriatim* rack bars on which pins representing the numbers written by the typewriter are to be set up. When a number has been completely set up, a general operator is actuated to carry the numbers thus set up into the computing wheels. The combined typewriting and computing machine of said patent is provided with a transposition device, whereby numbers, as printed on the work-sheet carried by the platen of the typewriter which travels to the left, may be registered on the proper computing wheels beginning at the left.

For setting the pins on the rack bars there is provided a series of setting bars or linkages extending across said rack bars and each in superposed relation with a transverse row of pins of corresponding values. The connection is such that whenever a numeral key is operated, the corresponding setting bar, which is mounted on bell crank arms, is swung into a depressed position, and in so swinging it will strike and depress the corresponding pin on any rack bar which has been selected by the typewriter carriage to accord with the denominational column being written in on the work-sheet.

According to the present invention the machine may be adapted to either add or substract. For this purpose each of the computation or rack bars may be formed with two racks thereon, one for addition and one for subtraction, and the computing wheels may be normally held clear of said rack bars. The machine is preferably so arranged that normally when the general operator is actuated, the addition racks of the rack bars and computing wheels are brought into mesh, and the computing wheels are turned to add. A subtraction lever may, however, be arranged to be settable either manually or automatically, so as to cause the computing wheels to mesh with the subtraction set of racks on the rack bars, and thus cause subtraction.

The computing wheels are provided with carry-over members, which are arranged to be set while numbers are being carried into the computing wheels from the computation members, said setting, however, not being sufficient to cause one computing wheel to directly operate another. On the return stroke of the general operator the rack bars are carried back to their normal positions, and at the same time a carry-over shaft completes the operation of the carry-over members which have been set, thus causing said carry-over members to carry or borrow "1" between juxtaposed computing wheels according as the operation is an adding or a subtracting one.

Any computing wheel, when it brings its zero to the sight opening of the casing, may set a carry-over member, and said carry-over member may give the adjacent computing wheel of next higher denomination one unit of a revolution on the return stroke of the general operator. Said carry-over devices, which thus are set, may be arranged to operate in one direction for addition and in the other direction for subtraction.

In the patent above named, the carriage of the typewriter controls the denomination selecting devices, which determine in which denomination the numbers written shall be registered *seriatim*. Said denomination selecting devices according to the present invention, may be moved to ineffective position when not in use, so as to reduce the wear and tear and noise incident to the operation of the machine. For this purpose the denomination selecting devices may include levers or bars, which are pivoted in a casing or frame normally held at a position where dogs settable on the usual tabulating bar of the typewriter may be effective to actuate said levers *seriatim* during a step-by-step letter-feeding movement of the carriage. When, however, it is desired to return the carriage or afford other movements thereof as by operating the back space key or by operating a tabulating key, said casing or frame with its denomination selectors is preferably swung so as to carry the levers therein out of the path and clear of the selecting dogs.

A dog mounted like the denomination selecting dogs may be utilized to automatically set the mechanism to subtract whenever the typewriting machine reaches a predetermined column. To bring about this result the subtraction dog actuates a special subtracting lever which controls or operates the usual subtraction bar and is cammed by the denomination selecting casing or frame similar to the denomination selecting levers. In order, however, to prevent the machine from being left at subtraction accidentally, a connection may be provided from the general operator whereby the operation of said general operator will release the subtraction bar and return the mechanism to adding position.

As herein disclosed, the invention is applied to a machine for computing sterling money, namely, in pounds, shillings, pence and farthings. In many machines for computing in sterling money, it has been customary to provide an extra "1" key for computing in the tens of pence column. According to the present invention the necessity of any such key is avoided. For this purpose a connection may be provided, such that if the digit "1" is written in the tens of pence column, it will set up in the computing mechanism a preliminary representation of eleven pence, but if the "0" key is next operated, thus writing a zero in the units of pence column, said "0" key will unset the equivalent of "11" which has been set up, and set up an equivalent of "10" in place thereof. Then when the general operator is actuated "10" will be carried into the computing wheels. If "1" is written in the units of pence column, the operation of the "1" key does not alter the setting of the computing mechanism from the way it was set by the previous operation of said key at the tens of pence column. That is to say, if after writing the second "1," the general operator were actuated, the "11" set up by the first key operation would be registered. Such a device, it will be observed, is not limited to pence; it can also be used for computing in twelfths, etc.

In order to prevent the running up of numbers at the wrong time, or in order to prevent moving the rack bars into mesh with the computing wheel pinions when there is danger of their not properly so meshing, the machine may be provided with a device for locking the general operator against actuation so long as the printing point on the work-sheet, determined by the position of the carriage, is in one of the effective digit columns of a computing zone or column. This will insure, among other things, that all the digits of a number will be completely written and set up before the general operator is actuated to run up the number in the computing wheels. That is to say, the general operator will be held rigid just as long as any one of the denomination selecting devices is actuated by one of the dogs on the carriage to position the pin-bearing rack bars to have the pins set thereon for the accumulation of a computation. To do this, a hook latch is operated by a bail universal to all of the denomination selecting devices so as to be actuated thereby. This latch engages an extension on the general operator and holds it fixed when any one of the denomination selecting devices is in its effective selecting condition. In a decimal system such a device to insure the writing of all the digits of a number may be essential for all of the denominational or digit columns as the zeros are always written. In the sterling or English system, however, where it is customary to omit the writing of zeros, if there should be no numbers to be computed in shillings, pence or farthings, it is found feasible to free the universal bail which actuates the locking hook, from subservience to any denomination selecting devices at points just succeeding the units of pounds, units of shillings and units of pence digit columns, so as to permit the actuation of the general operator at these points in case the complete number is written before the end of the entire computing zone or column is reached. The locking device is equally desirable both in decimal and non-decimal machines where it is necessary to prevent the actuation of the general operator during such time as the racks of the pin bars might fail to mesh with the computing wheel pinions.

Where a subtraction setting device is used which is automatically reset to addition by actuation of the general operator, as is shown herein, this locking device prevents such resetting from taking place until the typewriter carriage has traversed all the denominational letter spaces in a computing column; in other words, it is impossible to compute a number partly as though it was added and partly as though it was subtracted.

Means may also be provided for positively preventing injury to the pin-setting bars during the operation of the general operator should any happen to be depressed accidentally by the keys or otherwise. To accomplish this, the general operator may include a cam which rides under a bar universal to all the pin-setting bars, which pin-setting bars, it will be remembered, are depressed every time a numeral key is depressed. Said cam may raise said universal bar sufficiently to move all the pin-setting bars to their normal ineffective position before the general operator has moved any of the pin-bearing rack bars.

Other features and advantages will hereinafter appear.

In the accompanying drawings—

Figure 1 is a sectional side view of an Underwood-Hanson combined typewriting and computing machine, showing the principal parts necessary to understand my invention.

Fig. 2 is a plan view of the computing mechanism with the typewriter removed.

Fig. 3 is a rear view of the combined machine.

Fig. 4 is a skeleton perspective showing many of the parts of the present invention.

Fig. 5 is an enlarged view of part of Fig. 2.

Fig. 6 is a plan view of the pin bars and some related parts.

Fig. 7 is a side view of the farthings pin bar.

Fig. 8 is a side view of the units of pence bar.

Fig. 9 is a side view of the tens of pence bar.

Fig. 10 is a plan view of Fig. 9.

Fig. 11 is a plan view of Fig. 8 showing also the connection between the units and tens of pence bars.

Fig. 12 is a side view of the pounds and units of shillings bars.

Fig. 13 is a side view of the tens of shillings bar.

Fig. 14 is a plan view of Fig. 12.

Fig. 15 is a plan view of Fig. 13.

Fig. 16 shows the pence wheel and the farthings pawl which turns said wheel through a carry over.

Fig. 17 shows the units of shillings wheel and the pawl operated by the pence wheel which turns said wheel through a carry over.

Fig. 18 shows the tens of shillings wheel and the units of shillings pawl which turns it through a carry over.

Fig. 19 is a view showing as much of the numeral keys of the typewriter keyboard as is necessary to understand my invention.

Fig. 20 is a section transverse to the length of Fig. 6.

Fig. 21 is another section transverse to the length of Fig. 6.

Fig. 22 is a view of the computing wheels and principal adjacent parts during addition.

Fig. 23 is a similar view during subtraction.

Fig. 24 is a view similar to Fig. 22, with the parts set for tens-carrying.

Fig. 25 is a view similar to Fig. 23 with the parts set for tens-borrowing.

Figs. 26 to 31 are views showing the position of successive carry-over driving parts seen in Figs. 24 and 25.

Fig. 32 is a view similar to Figs. 22 and 23, but showing the parts in their normal idle positions.

Fig. 33 is a plan view of Fig. 32.

Fig. 34 is a section through the computing wheels of Fig. 33.

Fig. 35 is a detail front view of part of Fig. 33 showing the lock for the subtraction bar.

Fig. 36 is a side view of the subtraction bar and some adjacent parts.

Fig. 37 is a section showing the connections between the transposition device and the units of pence pin bar, showing ten pence being set up.

Fig. 38 is a side view of an auxiliary pin-restoring device.

Fig. 39 is a perspective view of Fig. 36 and some adjacent parts.

Fig. 40 is a front view of the pin-setting connections, said view also showing the relation of the pin bars to the setting linkages.

Fig. 41 is an end view of the typewriter carriage and some adjacent parts, showing the line-spacing device and some connected parts.

Fig. 42 shows the parts shown in Fig. 41, when the line-space lever has been operated.

Fig. 43 is a plan view of Fig. 42.

Fig. 44 is a side view of the tens of pence pin bar and shows its relation to the pin-restoring plate.

Fig. 45 is a section showing the operation of the general operator in restoring a depressed pin-setting bar.

Fig. 46 is a projection of the faces of the computing wheels.

Figs. 47 and 48 show the operation of the automatic subtraction dog.

Fig. 49 is a perspective view of part of Fig. 48.

Fig. 50 is a view of a denomination selecting dog.

Fig. 51 is a section through a clutch of the carry-over shaft.

Fig. 52 is a perspective showing the operation of the carry-over devices.

Fig. 53 is a side view of Fig. 52, showing the parts at the beginning of a carry over.

Fig. 54 is a view similar to Fig. 53, showing the parts having almost completed their motion.

Fig. 55 is a side view of the farthings computing wheel and the carry-over dog which it controls.

Fig. 56 is a perspective view of part of the shaft and parts attached thereto which drive the carry-over devices.

Fig. 57 is a fragmentary perspective view showing details of the transposition linkages which invert the order of action from the denomination selecting levers to the pin-bearing column bars.

Numeral keys 1 and alphabet keys 2 operate levers 3, 4, to vibrate type bars 5 upwardly, to strike against the front side of a platen 6 mounted on a carriage 7 which travels on a rail 8, and is controlled by a rack 9 meshing with a pinion 10 connected to an escapement wheel 11.

Each type bar has a heel 12 to engage a universal bar 13 mounted on a frame 14 which operates a rocker 15 having vibratory dogs 16, 17, to engage said escapement wheel and permit the carriage to feed step by step under the impulse of the usual spring barrel 7ᵃ.

The computing mechanism includes an index mechanism which is operable by the numeral keys; each key having a pendent rod 18 to engage and depress the corresponding one of a series of rock arms 19 (Fig. 5), which are arranged across the machine, being mounted upon the forward ends of rearwardly-extending horizontal rock shafts 20 (Figs. 1, 2 and 5), forming parts of linkages which depress the index pins.

Each rock shaft carries an upstanding arm 21 to engage a wrist or pin 22 upon a horizontal link 23, which extends from side to side of the machine. Two of said rock shafts also carry a second arm 21 for a purpose which will appear later.

At its ends, each link connects a pair of bell cranks 24 (Fig. 40), the long arms 25 of which are connected by links or depressor bars 26, which descend to press down index pins 27. Each numeral key thus determines the value of the index pin which is depressed or selected, while the typewriter carriage 7 determines the denomination of the depressed pin; each link or depressor bar 26 being capable of depressing one pin in each denomination in the decimal system.

The index pins 27 are arranged in rows upon bars 28 (Figs. 6 to 13), extending forwardly and rearwardly beneath the links 26 and serving eventually to rotate the number wheels in a manner presently to be described.

Normally the index pins are out of the path of movement of the depressor bars 26 (Figs. 6 to 13), but as the paper carriage 7 feeds step by step, the bars 28 are displaced forwardly one after another, to positions to bring their pins within range of the depressor bars 26 (Fig. 37), so that any bar 26 may depress the corresponding pin of the forwardly-displaced pin-bar. Any suitable means may be employed for displacing the pin-bars forwardly one after another during the movement of the paper carriage; but there is shown herein, for the sake of illustration, a mechanism for this purpose which will presently be referred to.

Such index pins as are depressed, project below the bars 28 on which they are carried, and serve as lugs whereby said bars may be driven endwise forwardly for turning the number wheels. They are driven by means of a universal driver in the form of a transverse horizontal bar 29 which forms part of a general operator which is operated once for every calculation.

The general operator in the Underwood-Hanson combined adding and typewriting machine comprises side bars 30 (Fig. 2), which are slid in guides on the side walls of the framework and are rigidly united to form a slide or carriage; said cross bar 29 forming one of the devices for tying said bars 30 together. This carriage or general operator may be driven in any suitable way, as for instance by a crank 31 which is fixed upon a transverse horizontal rock shaft 32, journaled at its ends in the framework of the machine, and carrying (Fig. 1) at its ends segments 33 which mesh with idle pinions 34, the latter meshing with racks 35 formed upon said general operator side bars 30.

A movement of the crank 31 forwardly from the Fig. 1 position causes the general operator to drive forwardly, and the bar 29 thereon engages any depressed index pins 27 and drives forwardly the bars 28 on which they are mounted.

At its forward end each of said index pin-bars 28 carries an addition rack 36 normally out of mesh with a pinion 37, which is fixed to a number or computing wheel 38 forming one of a gang, there being one pin-bar 28 for each number wheel. These number wheels are arranged below a sight opening 39 in the casing of the machine.

The cross bar 29, which engages the depressed index pins, is placed some distance behind said pins, so as to permit considerable lost motion of the general operator before the first pin can be engaged by said cross bar, and during this lost motion the racks 36 become meshed with the number wheel pinions 37. This result is effected in the following manner: Carried upon power shaft 32 and rotated thereby is a disk 40 (Figs. 1, 2, 4, 22 and 32), which, as soon as the crank 31 starts to turn, engages a rider or pawl 41 pivoted at 42 upon an arm 43 of a lever 45. The rider or pawl 41 is normally held by a spring 41ᵃ against a stop 41ᵇ so that the toe thereof forms a rigid strut spacing the arm 43 from the cam disk 40, whereby when the cam disk 40 rotates from the position shown in Fig. 1 to the position shown in Fig. 22, in the direction of the arrow in the latter figure, the cam surface 67 of the disk 40, as the pawl 41 rides from the minor portion of the disk to the major portion thereof, will force the arm 43 away from the axis 32 of the disk 40, so as to rock the lever 45. The lever 45 is fixed to a rock shaft 44 and has a counterpart for one arm thereof in an arm 56 also secured to the rock shaft 44.

When the lever 45 is rocked in this manner, it will draw down on a pair of links 46 and 57, which are pivoted on the ends of a connecting rod or shaft 58 which joins the forward end of the arm 56 with the forward end of one arm of the lever 45. The links 46 and 57 are connected at their upper ends to an arbor 49 on which all of the computing or number wheels 38 and the pinions 37 therefor are mounted. Also mounted on the arbor 49 is a shifting frame including side plates 50 and 51.

It will thus be seen that when the cam 40 is rotated to the position shown in Fig. 22, it will rock the lever 45 and the parts connected thereto which form a shifting frame, so that the pinions 37 will be drawn down into mesh with the addition racks 36 on the rack bars 28.

Hence as the general operator continues to drive forward under the impulse of the crank 31, the pinions are turned clockwise at Fig. 22 and the number wheels are turned in the same forward direction, thus performing addition; each number wheel being advanced to an extent dependent upon which of its index pins 27 was depressed.

After the crank 31 has been given a full forward stroke, it is swung backwardly to normal position to restore the general operator to its normal position. At the initial portion of the return stroke of the crank 31 and its shaft 32, the rider or pawl 41 turns counter-clockwise against the tension of the spring 41ª owing to the friction on the disk 40 turning in the reverse direction from that indicated by the arrow in Fig. 22. This renders the rider 41 incapable of acting any longer as a strut, so that the arm 43 is permitted to approach the cam disk 40 under the traction of springs 47, (Figs. 32, 33 and 34), which now act to draw rearwardly V-shaped or double cam levers or arms 47ª pivoted at 47ᵇ, which engage the ends of said arbor 49 and thereby centralize or raise the pinions 37 clear of the rack bars 36, at the same time restoring the parts 43 and 45 to their normal positions.

This movement, which withdraws the pinions 37 from the addition racks 36, takes place before the racks themselves start upon their return or rearward movement toward normal position; such return being preferably effected by the same cross bar 29 which previously carried the racks forward. The cross bar 29 for this purpose engages (see Fig. 37) lugs 48 pendent from the rack bars in the rear of the cross bar 29, but the latter is arranged to have considerable idle rearward motion (enough to permit collapse of pawl 41) before engaging said lugs 48.

At this point it may be noted that the arbor 49 on which the number wheels 38 and their pinions 37 are mounted, connects the two sides 50 and 51 of a swinging frame (Figs. 4 and 33), which has bearings or sockets at 52 to swing upon collars 53 carried by a transverse horizontal shaft 54; this shaft forming a convenient hinged support for said frame 50, 51, and keeping the computing wheels always in proper relationship to the shaft 54, which is connected to the general operator and carries certain prime moving tens-carrying devices, as will presently be explained. The side members 50, 51 are also connected by a plurality of tie-rods 55.

Upon each of said index pin-bars 28 is carried not only an addition rack 36 but also a subtraction rack 59 which is idle, as at Fig. 22, during an addition operation. This rack is parallel with the addition rack 36 but above the pinion 37 so as to rotate the same in the opposite direction, and is connected by an arm 60 with the forward end of the bar 28.

To cause the machine to subtract at the driving strokes of the index pin-bars 28, it is only necessary to move the computation pinions 37 into mesh with the subtraction racks 59, instead of the addition racks 36, so that the number wheels will be turned backwardly at the ensuing forward drive of the index bars 28.

When the operator desires that the machine shall perform subtraction, he presses rearwardly a subtraction key 61 on the forward end of a rod or bar 62, which extends from front to rear of the machine, and slides on suitable supports 62ª at the front and rear of the machine. Between its ends, this rod carries a cam 63 (Figs. 2, 4, 6 and 39), which, during the backward thrust of the rod, engages the end of a sleeve 63ª and forces the same endwise along the shaft 32 against the tension of a spring 63ᵇ. The sleeve 63ª carries the cam disk 40 with it so that the latter is displaced sidewise relatively to the pawl 41, thereby interrupting the coöperation therebetween and preventing the rocking of the lever 45 by the cam disk 40. At the same time is brought into play a second cam disk 64 also fast to said sleeve, which is effective only for the purpose of subtraction.

This disk 64 is arranged to coöperate with a follower or pawl 65, which is out of line with the pawl 41, that is, it works in a different plane so as not to be in action at the same time. The disk 64 is shifted into the same plane as its pawl 65 when the cam disk 40 is shifted out of engagement with the pawl 41.

During the ensuing forward stroke of the general operator, the cam disk 40 will rotate idly; but the cam disk 64, as seen at Fig. 23, will depress, by means of the cam surface 68 which connects the minor circumference of this disk with the major circumference thereof, the follower or pawl 65, which is normally held by a spring 65$^a$ against a stop 65$^b$ to form a spacing strut between the cam disk 64 and an arm 74 rigid with the lever 45. The lever 45, the shaft 44 and the arm 56 will thus be rocked so as to force upwardly the links 46 and 57, thereby lifting the frame 49, 50, 51, 55, and carrying the pinions 37 into mesh with the subtraction racks 59, so that the latter are enabled to turn the number wheels backwardly during the remainder of the forward stroke of the general operator. On the return stroke, the pawl 65 will tilt against the tension of the spring 65$^a$ to a receded position, releasing the arm 74, so that the V-cam arms 47$^a$ will force the number wheels and their pinions 37 clear of the racks 59.

It will thus be seen that the springs 41$^a$ and 65$^a$ normally hold the pawls or riders 41 and 65 in a position to engage their respective disks 40 and 64, so that as one or the other rides from the lower circumference to the higher circumference by way of the cam 67 or 68, the bell crank 45 will be rocked in one direction or the other according to which disk 40 or 64 is in action. The pinions 37 will then be brought into engagement with the addition racks 36 or the substraction racks 59 to rotate the computing wheels in a forward or a backward direction for addition or subtraction respectively.

The counter-rotation of either of the cam disks 40 or 64 tilts its pawl or rider 41 or 65, so that the same is ineffective to space the arms to which it is connected from the respective cam disk. Therefore, in spite of the fact that the surface farthest from the center of the shaft 32 is in action, the accordant arm 43 or 74, which has just been rocked to bring about an engagement of the pinions 37 with one of the racks 36 or 59, will be permitted to approach nearer to the center of the shaft 32 under the traction of the springs 47, which not only draw the pinions 37 and the dial or computing wheels connected thereto to a mid-position but also swing the lever 45 and the arms 43 and 74 connected thereto to a mid-position such that the pawls or riders 41 and 65 will be in a position to engage with the minor circumference of their respective cam disks 40 and 64. On a subsequent rotation of the general operator, the cam 67 or 68 of the cam disk 40 or 64, whichever happens to be in action, will rock the accordant arm 43, 74 to bring about an addition or a subtraction coöperation between the pinions 37 and the racks 36 or 59.

The cam disks 40, 64, while moving endwise of the shaft 32 with the sleeve 63$^a$, sometimes in the direction of the propulsion of the spring 63$^b$ and sometimes against the tension of this spring, are held against rotation relatively to the shaft 32. That is to say, they are splined on the shaft 32 by means of a pin 69 carried on an arm 70 fixed to the shaft 32 and passing through a hole in the disk 40. Inasmuch as both disks are rigid with the sleeve 63$^a$ and with each other, this serves to spline both the disks 40 and 64 on the shaft 32. The tens-carrying or carry-over devices comprise an idle pinion 71 (see Figs. 1 and 2) meshing with a rack 72 on the general operator, to connect said operator with a pinion 73 on the horizontal transverse shaft 54, which is the tens-carrying assisting shaft. This shaft 54 has a helical series of adding cams or tappets 75 (Figs. 52 and 56) for carrying "1" in an addition computation. This shaft 54 has also a second helical series of subtracting cams or tapets 95 (Figs. 52 and 56) for borrowing "1" in a subtraction computation. The cams or tappets 75 and 95 are alternative in their action according to whether the computing wheels 38 are rotating to add or to subtract. This shaft 54, however, turns in only one direction and is operated only during the return stroke of the general operator; being for this purpose connected by a one-way ball-clutch mechanism 76 to the pinion 73, as seen at Fig. 51. A spring 132$^a$ holds a detent 132$^b$, Fig. 2, to prevent backward rotation of the shaft 54.

Each number wheel (except that of lowest denomination) has an individual train of mechanism for connecting it to this power-driven tens-carying shaft 54 to be driven therefrom. The train, however, is normally broken, and hence the tappets or cams 75, 95 are all normally ineffective. Each number wheel 38 (except that of highest denomination) has a starting tooth 77, the function of which is to establish a connection from the number wheel of next higher denomination to the tens-carrying shaft 54, when it is necessary to carry "1" to or borrow "1" from the next higher wheel.

Each of the trains of connecting devices includes (Fig. 52) a pawl 78 to mesh with a gear 79 fixed upon the number wheel 38; the pawl preferably having multiple teeth 80, or being in the form of a short rack, so as to engage and operate the gear 79 when moving from an offset position at either side to a mid-position. Each rack or pawl 78 is normally out of mesh with its gear wheel 79 but is brought up into mesh therewith in time on the return stroke of the general operator during the carry-over operation. Each rack or pawl 78 is also normally in a neutral non-driving mid-position, but the starting tooth of each computing wheel on completing a cycle corresponding to the exchange value between it and the next higher computing wheel, shifts its pawl to one side or the other for a subsequent drive in one direction or the other according to whether "1" is to be carried or borrowed.

To this end, the pawl 78 has a pin-and-slot connection at 81 with a double bell crank lever, tumbler or rocker 85, 93, which is in the nature of an interponent device between the power-driven tens-carrying cams 75 and the number-wheel rotating pawl 78. This lever has a lower arm 85 and an upper arm 93 and is pivoted between its ends upon an arbor 82. It also has a short arm 83 provided with a pin 84 in the path of said starting or setting tooth 77 to be swung in one direction or the other thereby according to whether the associated computing wheel 38 is rotating for addition or subtraction.

The number wheel 38 turns in the direction of the arrow, or clockwise, as at Fig. 53, to perform addition. The setting tooth 77 at the completion of a full cycle of said number wheel 38, engages and depresses the pin 84 together with the arm 83, swinging said interponent lever or rocker to the position seen at Figs. 24 and 53.

The lower arm 85 of said lever or rocker has a slot to engage with the pin 81 on the tens-carrying pawl 78, which by the movement of the rocker to the Fig. 24 position is drawn back from the normal position at Fig. 22. Upon said arm 85 is a cam-like tooth 86, which at Fig. 24 is seen as having been swung into the path of the associated adding tappet 75 on the tens-carrying shaft 54, the function of the latter being to act upon said tooth 86, and thereby return the rocker forward to its normal position. During such return movement, the rocker arm 85 carries with it the pawl 78, which, however, has in the meantime been swung up into mesh with the gear 79 of the number wheel next higher than that which carries the setting tooth 77, by a cam 87 provided on the tens-carrying assisting shaft 54, which engages and depresses the rear end 96 of the pawl 78 and lifts the forward end thereof into mesh with the associated gear 79 as at Fig. 53. The pawl 78 is supported intermediate its ends for this purpose, by a rod 88, which connects arms 89 depending from the side plates 50 and 51 forming part of the frame which permits the shifting of the gears 37 and the tens-carrying mechanism about the shaft 54 as a pivot. The forward springing of the pawl 78 is effected in this instance by the engagement of the tappet 75 with the rocker tooth 86.

By means of said pawl 78, the higher number wheel is advanced one point by the time the rocker 85, 93 reaches its mid-position shown at Fig. 54. The cam 87 has a continuation or dwell portion 90 (Figs. 53 and 54), which holds down the rear end of the pawl 78 during the wheel-driving movement, and which at the end of the driving movement releases said pawl and permits the forward end thereof to be snapped down by a spring 91 (Fig. 22) out of mesh with the gear 79; a spring held detent 92 engaging the latter to hold the number wheel in position.

At the subtracting operation, which includes what may be called tens-borrowing, the setting tooth 77 on the number wheel, which is traveling counter-clockwise (Fig. 23) lifts the arm 83 and swings the rocker 85, 93 to the Fig. 25 position so as to carry the lower end forward and bring the pawl or rack 78 to an advanced position ready to engage the pinion 79 and effect a backward movement thereof.

The upper arm 93 of the rocker has a tooth 94 which at this time is swung into the path of the subtraction cam or tappet 95 on the assisting shaft 54; the tappets 95 being spirally arranged and being paired with the tappets 75. The tappets 95 are in different planes from the tappets 75, and the tooth 94 is correspondingly offset from the arm 93. The cam 87 depresses the rear end 96 of the pawl 78 and elevates the front end thereof into mesh with the gear 79, so that the tappet 95 camming or acting upon the tooth 94 in swinging the rocker 93, 85 to the normal midway position at Fig. 23, draws the pawl 78 backwardly giving a one step reverse movement to the associated computing wheel 38. At the conclusion of the tens-borrowing operation, the cam 87 releases the rear end 96 of the pawl, and the forward end of the latter is drawn down by the spring 91 as before.

Each cam 87, together with its associated tappets 75 and 95, forms a group, and said groups, as seen at Fig. 56, are arranged spirally on the shaft 54, so that the computing wheels are successively operated by the carry-over devices from lower to higher denominations.

It will be seen that the rocker 85, 93 may be regarded as a tumbler or interponent, since it enables the pawl 78 to be operated by the tappets 75, 95 on the power shaft 54; and that the operation of said rocker, as effected by the tappets, resembles the operation of a pallet in an escapement mechanism.

The rocker or tumbler 85, 93 is held in any of its three positions (Figs. 22, 24 and 25) by means of a detent 97 pivoted upon a rod 98, which rod connects the side plates 50, 51 just in front of the rod 55, and said detent is pressed downwardly by a spring 99 coiled around the rod 55; the detent having three notches 100, 101 and 102 to engage a pin 103 on the tumbler to hold the same in any of the three positions.

It will be seen that the sides of the notches 100 and 102 are extended to form hooks which positively stop the rocker 85, 93 at each of its extreme positions; although, if desired, this rocker 85, 93 may be positively arrested by the engagement of either tooth 86 or 94 with the circular hub portions 103ª of the disks on which the cams or tappets 75 and 95 are formed, Figs. 26 and 56.

It will be understood that, owing to the speed with which the power-driven tens-carrying shaft 54 revolves, the tappet 75 is apt to operate the tens-carrying rocker 85, 93 at such speed in swinging it to the normal position seen at Fig. 54, that the rocker with the pawl 78 and the number wheel might overthrow. To guard against this, there are provided on the shaft 54, stops 95ª concentric with said shaft and merging into or being continuations of the tappets 95. These stops 95ª are so placed that each occupies the path of the tooth 94 on the associated rocker 85, 93, when the latter is swung by the tappet 75 from the Fig. 53 position to the normal position at Figs. 52, 1, 32, 22 and 54. Of course the shaft 54 is revolving, and it is only for a brief period that the stop or dwell portion 95ª remains in the path of the tooth, shoulder or projection 94; but this is sufficient to prevent overthrow of the rocker 85, 93.

Overthrow is prevented at the operation of borrowing tens in a similar manner. At Fig. 25 the rocker 85, 93 is shown as rocked over to begin a subtraction operation; and after the pawl 78 is elevated, the tappet 95 engages the tooth or shoulder 94 and swings it to the position at Fig. 54, at which time the shoulder or tooth 86 will be arrested by stop 95ᵇ which is a continuation of the tappet 75. This positively prevents overthrow of the rocker 85, 93 at the subtraction or tens-borrowing operation, the stop or dwell 95ᵇ being sufficiently long for this purpose. That is to say, the outer margins or dwell portions of each pair of tappets 75 and 95 for each of the dial or computing wheels 38, are so arranged with respect to each other that as one of these tappets engages its associated tooth 86, 94 on the rocker or interponent 85, 93 to swing said rocker to a mid-position, the dwell portion of the other tappet will come into the path of movement of its accordant tooth 94 or 86 according to which tappet is in action, so as to prevent an excessive movement of the rocker 85, 93 beyond the mid-position shown in Fig. 54.

The number wheels have individual tens-carrying trains each comprising the tumbler 85, 93, the detent 97, the tappets 75, 95, the pawl 78 and the gear 79. It will be understood that all of these tens-carrying trains are mounted upon the swing frame 50, 51, and, therefore, that the number wheels with their pinions, detents 92, gears, and tens-carrying trains swing up and down as a unit about said power shaft 54, which serves as a support for the rear end of said frame, as already explained. Owing to the fact that these members swing up and down as a unit, the carry-over mechanism including the setting tooth 77 is enabled to perform its functions properly whether the wheels are in the addition position as at Fig. 24 or in the subtraction position as at Fig. 25.

The reason for arranging the tappets 75 (and tappets 95) in spiral relation around the power shaft 54, is that this enables tens to be carried upon the number wheels *seriatim*, so that the machine is capable of carrying "1" over from wheel to wheel throughout the entire set at the tens-carrying operation; the operation of one tens-carrying train being finished before the operation of the next higher train can begin.

The pawls 78 may be guided at their rear ends in a comb 104, and any suitable provision may be made for guiding their forward ends, as, for instance, said forward ends may be confined between the racks 36 and the dial wheels 38.

The subtraction rod 62 is held back during the subtraction operation by means of a latch 105 (Figs. 1, 4, 36, and 39), which is pivoted at 106 upon the framework and is held by a spring 107 in a notch 107ª in the rod or bar 62. This latch is automatically released at the conclusion of the return stroke of the general operator, after the operation of the tens-borrowing or carry-over mechanism has been completed. This latch-releasing operation occurs simultaneously with the raising of a universal plate 108, which restores the index pins 27 to normal positions. The pin-restoring plate 108 is operated in the usual manner, and is pivoted as usual upon bell cranks 109 connected by a link 110.

During the last part of the return stroke of the general operator, a pawl or abutment 111 on one of the side bars 30 usually engages an arm 112 rigidly connected to an arm 112ª to cause the latter to swing upwardly, and thus raise the plate 108, thereby lifting the index pins 27. Thereupon the arm 112 trips off from the abutment 111 and the plate 108 drops.

During the rise of the plate 108, an arm 113 connected to one of said bell cranks 109 swings down and strikes a heel 114 on the latch 105, thus withdrawing the same from the notch 107ª in the subtraction rod or bar 62, so that a spring 115 (Fig. 2) may snap the latter forwardly to normal position, as seen at Fig. 1.

It will be seen that the arm 113 is fixed upon a rock shaft 116 upon which one of the bell cranks 109 is fixed. If it be desired to retain the key 61 in its rearward position, a bolt 117 (Figs. 33 and 35) may be slid to the left by means of a finger-piece 118 to engage a notch 119 in the rod 62; a spring detent 120 holding the bolt in either position.

The index pin bars 28 may be guided at their forward ends in a comb 121 (Fig. 1) extending between side plates 121ª of the computing head. The bars 28 may be confined between said comb 121 and a rod 122 extending across the tops of the pin-bars 28. At their rear ends the bars may be guided in a fixed comb 123.

It has been stated above that the pin-bars 28 are normally located in such a position that the pins 27 thereon are not disposed directly below the pin-setting bars 26 but offset to a position between the same, so that if the numeral keys were depressed no pins would be set up. It is hence necessary as the carriage moves step by step in a letter-feeding direction to come into different denominational or digit colums, that the pin-bearing rack bars 28 be displaced individually and in succession to correspond with the denominational column at the printing point, and to bring the pins 27 on the proper pin-bars 28 directly subjacent the pin-setting bars 26, so that when a numeral key is actuated, the pin corresponding to the numeral key and corresponding to the denominational column in which the number is printed, will be set.

For displacing the index pin-bars 28 preparatory to setting the pins thereon, there are provided upon the typewriter carriage 7, one or more dogs 124 (Figs. 1, 3, 49 and 50). These dogs, which may or may not be used also as column stops, are adjustable along a rack 125 which is fixed to the typewriter carriage 7 and which is preferably the usual column-stop rack of the typewriter tabulating mechanism. Each dog has a beveled or cam face 126 to engage beveled edges 127 on the upper ends of denomination selecting levers 128 to cam the latter backwardly at the movement of the typewriter carriage, as illustrated at Fig. 47, at which figure, it will be understood the carriage has completed a letter-feeding movement so that a lever 128 is held back while the carriage remains in such position, to receive the type impression.

Inasmuch as the carriage 7 travels from right to left, each dog 124 operates the series of denomination-selecting levers 128 individually and *seriatim*, beginning with the one farthest to the right and advancing to the one farthest to the left. Inasmuch as, however, the computing in the computing head comprising the wheels 38 starts with the computing wheel of highest denomination at the left and proceeds *seriatim* to the computing wheel of lowest denomination at the right, the order of operation of the rack bars 28 coöperating with the computing wheels 38 must be inverted from the order of the operation of the denomination selecting levers 128. For this purpose, the denomination selecting levers 128, which are pivoted intermediate their ends on a floating support including a pivot rod 129, are each arranged to operate a transposition device, which in turn operates one of the rack bars 28 to shift the same forwardly to such a position that the pins thereon may be set. The transposition linkage in each case, however, is of such a character that the denomination selecting lever 128 farthest to the right will shift the column-determining rack bar 28 farthest to the left while the denomination selecting lever 128 farthest to the left will shift the column-determining rack bar 28 farthest to the right, with the intermediate levers 128 actuating the intermediate rack bars 28 in inverse order.

Considering the particular form of these transposition devices, each lever 128 is pivoted at its lower end at 130 to a link 131, which in turn is connected at 132 to actuate an arm 134 connected to oscillate a rock shaft 135, Figs. 5 and 57, said rock shafts journaled in side plates 135ª within the machine. The arms 134 are arranged in echolon, so as to avoid one another and permit the connection of the links 131 thereto, which links are of graded lengths to reach the different arms 134. The rock shafts 135 also have secured thereon arms 136 which they swing, when they themselves are rocked, to reciprocate hooks 137. The arms 136 are also arranged in echelon to avoid one another and to permit the connection thereto of the hooks 137, which also are of graded lengths to correspond with the different positions of the shafts 135 and the arms 136 thereon. The arms 136 may be longer than the arms 134 to permit the hooks 137 to extend rearwardly in a plane below the links 131.

It will be noted that the arms 134 are arranged in a diagonal line on the shafts 135 extending forwardly from right to left while the arms 136 are arranged in a crossing diagonal line on the shafts 135 extending forwardly from left to right. At the point of crossing of the two diagonal lines, it is not found necessary to provide two arms 134 and 136, as the denominational column, as determined by the position of the carriage at this mid-location, corresponds with the denominational column as determined by the middle computing wheel of the series 38. This single arm is indicated at 133 and is connected to both a link 131 and a hook 137.

By the above-mentioned cross-arrangement of the arms 134 and 136, the order of actuation of the denomination selecting levers 128 which proceeds from right to left, is inverted to the order of action of the hooks 137 which proceeds from left to right. The hooks 137 are similarly arranged to actuate the column rack bars 28 successively from left to right, and for this purpose they are each provided with a depending tooth or lug 138 which extends downwardly in the plane of the rear end of its associated pin-bearing rack bar 28. The lugs 138 do not have direct contact with the bars 28, but in order to compensate for inaccuracies arising in manufacture or use of the machine, each tooth or lug 138 may have an adjustable head 139 (Fig. 37) to abut against the rear end of its index pin-bar 28. The head 139 may be formed on the end of an adjustable screw 140 threaded through the lug 138 from front to rear. The hooks or links 137 are guided in a comb 141 and have stops 142 in rear of said comb to prevent accidental excessive forward movements thereof.

Each index pin-bar 28 may be provided with a return means in the form of a pawl or arm 143 (Fig. 1) pivoted at 144 on a rod mounted in brackets 143a secured to the rear side plate of the cross frame supporting the pin-setting linkages, each pawl having a return spring 145 which causes the pawl to bear against a shoulder 146 on the bar 28, said shoulder inclining to the rear and formed to permit the pawl 143 to ride idly upon the top edge of the rear portion of the bar 28 during the number wheel driving forward movement of the latter; these pawls 143 serving, however, to return the bars 28 promptly from the position at Fig. 37 at which said bars are displaced by the denomination selecting means to the normal Fig. 8 position.

A short universal bar 147, mounted upon arms 148 secured to a rock shaft 149 and pulled rearwardly by a spring 150, may bear against all the lugs 138 to return them to normal positions after actuation, together with the transposition linkages and the levers 128.

There is also shown herein mechanism for preventing the denominational selecting dogs 124 from clashing with the denominational levers 128 during the return movement of the carriage 7; but this clashing-preventing mechanism can be used in connection with other denominational dogs and other devices for displacing the index pin-bars. These devices, however, are especially valuable in connection with one or more denominational selecting dogs, such as are shown adjustable along the ordinary rack 125. One of the advantages of the dog 124 is that it is rigidly mounted, and hence when the carriage stands at any printing position within the adding zone, there must be a displaced lever and an index pin-bar of corresponding denomination, thus avoiding one of the difficulties to which a usually pivoted selecting dog might, in some cases, be subject.

The clashing between the denominational selecting dogs 124 and levers 128, during the return stroke of the carriage, is prevented by the following means. In order to prevent the carriage from being pressed back by the operator applying his hand thereto in the usual manner, there is provided upon the carriage a rack 71a which may be connected to said column stop rack 125 (Figs. 1, 3 and 4); and upon the machine there is pivoted at 152 a pawl 153 pressed into engagement with said rack by a spring 154. The carriage can be released from this locking device only when there is effected a concomitant disconnection or relative displacement between the dogs 124 and the levers 128.

The pawl 153 is pivoted upon a bracket 155 which is fixed upon the usual decimal tabulator plunger stop casing of the typewriting machine frame and is arranged to be disengaged from the rack 71a by a shifting frame comprising cross bars 156 and 174 connecting a pair of upstanding rock arms 157, which latter are pivotally mounted on a shaft 158 (Fig. 4). This frame forms a shifting support for the set of denomination selecting levers 128, which, as stated above, are pivotally mounted on the shaft 129 which in turn is mounted in the side arms 157 of the frame, so that when this frame swings toward and from the machine, the selector levers 128 will be moved respectively to effective and ineffective positions. That is to say, if the frame is moved rearwardly it will carry the upper ends of the levers 128 clear of the tappets or dogs 124, so as to permit the same to pass idly, but if the frame is swung forwardly toward the machine, the upper ends of these selector levers 128 will be brought into the path of the dogs 124. The levers 128 during such back and forth movements swing about their pivots 130, which are themselves restrained from backward movement by engagement of the lugs 138 with the guide comb 141.

It will thus be seen while the pawl 153, which is beveled in one direction to correspond with the bevel of the teeth on the rack 71a, will permit unlimited step-by-step movements of the carriage 7, that it will positively prevent any return movement of the carriage 7, so that the tappets or dogs 124 cannot be brought into engagement with the denominational selecting bars or levers 128 while the carriage is moving in the return direction. Inasmuch as the object of the locking pawl 153 is to prevent such clashing between the dogs 124 and the denomination selecting levers 128, provision is made whereby whenever the frame comprising the side plates 157 and the cross bar 156 is moved to a rearward position to bodily carry the denominational levers 128 free and clear of the path of movement of the dogs 124, then the pawl 153 will be withdrawn from engagement with the locking rack 71a.

To this end, an extension 159 on the locking pawl 153 projects into a notch formed by ears 158a provided on the frame comprising the side arms 157 and the cross bar 156, so that the locking pawl 153 will be rocked back and forth with a rocking movement of the frame 156, 157, whereby when this frame is in its rearmost position corresponding to the inactive position of the denomination-selecting bars or levers 128, the locking pawl 153 will be at the same time in an ineffective position permitting a return movement of the carriage 7.

Inasmuch as the most natural way to return the carriage is to use the customary line-space lever 160, which not only returns the carriage but line spaces the platen, provision is made whereby when this line-space lever is actuated not only will the platen be spaced and the carriage returned, but also the denomination-selecting levers 128 will be carried free and clear of the path of movement of the dogs 124. At the same time, as mentioned above, the locking pawl 153 will be brought out of mesh with the rack 71ᵃ, so as to permit this return movement of the carriage 7.

At Figs. 4, 41, 42 and 43 is shown mechanism whereby at the operation of the usual line-spacing carriage-returning handle 160, the pawl-and-lever retracting frame 156, 157 is automatically swung backwardly. Said lever on the Underwood machine usually has an arm 161 to press backwardly against the tension of a spring 161ᵃ, a sliding bar 162 to which is pivoted a pawl 163 to engage a line-spacing ratchet wheel 164 connected to the axle 165 of the platen 6. Said arm 161, in this instance, comprises a lug 166 which presses backwardly a sliding bar 167 simultaneously with the bar 162, said bar 167 including slots 168 in which ride guide pins 82ᶜ and said bar engages an arm 170 depending from a rock shaft 171 mounted on the carriage and extending therealong, and carrying a bail comprising a long bar 172 and short arms 173; said bar 172 arranged to engage the cross bar 174 which joins the arms 157 at their upper ends, to swing the frame 156, 157 rearwardly against the tension of springs 206 which normally hold the set of selector levers 128 up to their work.

The line-space handle 160 is swung about its pivot 175 to effect the line-spacing, to silence the carriage lock 153, and to retire the levers 128; continued pressure upon said handle effecting the return movement of the carriage to begin a new line of writing.

There may be provided upon the bar 174 a guard hook 176 to prevent the bar 172 from swinging too high, and the frame 156, 157 from swinging too far to the rear, both being accomplished by the bar 172 engaging and holding in the bight of the hook 176.

It sometimes happens that it is necessary to back-space the typewriter carriage 7 for the purpose of correcting an error, and under these circumstances it is undesirable to have the dog 124 operate the denomination selecting levers 128; also where the dog 124 has only a single cam surface 126, as in Fig. 47, it is impossible to return the typewriter carriage while said dog is effective on the levers 128. Hence these denomination selecting levers are moved rearwardly clear of the dogs 124, so as to be unaffected thereby. To do this, connections are made to the usual back-spacing mechanism whereby the frame, including the side plates 157 which support the denomination selecting levers 128, is moved bodily rearwardly carrying the levers 128 with it, so that their upper ends are free and clear of the dogs 124 on the carriage and out of the path of movement thereof.

Considering this mechanism specifically, at Fig. 1, 177 is a back-spacing key; and the back-spacing mechanism shown at this figure agrees substantially with that shown in Fig. 4 of the Helmond patent, No. 930,962, of August 10, 1909; the key 177 being mounted on a lever 178 extending forwardly from a rock shaft 179; said rock shaft carrying an arm 180, which, by means of a link 181, operates the back-spacing dog 182, the latter corresponding to the part 20 of said Helmond patent.

The present improvements may be used with any kind of back-spacing mechanism; but the usual Underwood mechanism is illustrated for convenience. This back-spacing key 177 is connected to remove the locking pawl 153 from engagement with the locking rack 71ᵃ and thus unlock the carriage preparatory to the back-spacing movement thereof. For this purpose an arm 183 extends rearwardly from the rock shaft 179; and a link 184 extends upwardly from said arm 183 (Fig. 4) to connect it to a bell crank or dog 185 having an arm 186 to engage a pin 187 projecting from one of the rocking frame arms 157. Depression of the key lever 178 rocks the shaft 179, lifts the free end of arm 183 and link 184 and rocks the arm 186 backwardly to force back the frame 156, 157 to release the carriage locking pawl 153 and retire the denominational levers 128. Thus the carriage is released at the first part of the stroke of the back-spacing key 177, and during the completion of said stroke the carriage is spaced backwardly in the manner described at length in said patent to Helmond. While the provision is made for withdrawing the denominational levers or jacks 128 from the path of the dog to avoid liability of injury, yet after the operation of the back-spacing key 177, the dog 124, when assuming its new position, is sure to displace the right lever or jack 128.

Besides the above described provision for withdrawing the denominational levers 128, to permit the paper carriage 7 to be returned, there is also provision made for withdrawing said levers, so that the dogs 124 will not strike them when the carriage 7 is running rapidly in letter-feeding direction during a tabulating operation. The decimal tabulator keys are seen at 188 (Fig. 1) being mounted upon levers 189 fulcrumed at 190, and at their rear ends swinging up to lift rods 191, whose upper portions terminate in decimal stops 192, which project upwardly to intercept column stops 193.

The releasing of the paper carriage 7 in the tabulating operation is effected by a small universal bar 194 lifted by shoulders 195 on said upright rods 191. This universal bar is secured to a rock shaft 194$^a$, having an arm 195$^a$ connected by a link 196 to a lever 197 which is pivoted between its ends and carries on its forward end a roll 198, which takes under the rack 9 to lift the same from the pinion 10, to permit the carriage to be driven freely by its spring 7$^a$ until arrested by the engagement of the nearest column stop 193 with the projected decimal stop 192. As far as described, the tabulating mechanism is in common use on said Underwood-Hanson machine.

Extending upwardly from said rock shaft 194$^a$ is an arm 199 which engages a lever 200 pivoted at 201 on the decimal tabulator frame and arranged at its upper end to bear against one of the upstanding arms 157, to swing back the frame 156, 156, together with the levers 128, which are hence withdrawn from the path of said dogs 124 whenever any tabulator key 188 is depressed.

At Figs. 49 and 50, it will be seen that the dog 124 is secured upon the column stop 193. Hence when any column stop 193 is inserted at the desired position in rack 125, the dog 124 is adjusted to position therewith, so that when the carriage is arrested at the point to write a figure of any selected denomination, the dog 124 will hold back a lever 128 of the same denomination, and hence when a numeral key is operated at such place, not only will the types strike in the right place but there will also be a depression of a corresponding index pin 27 upon the bar 28 of a corresponding denomination. Of course there may be used at the same time, column stops 193 not having the dogs 124, if desired.

Provision is also made to prevent an actuation of the general operator to run up a computation while the carriage is at any point in a computing zone prior to the finish thereof. That is to say, when any one of the dogs 124 is in a position holding back a denomination-selecting lever 128 so that the associated pin-bar 28 will be in a position to have the pins set up thereon, then the general operator will be locked against actuation. This provision is in the form of a hook or bar 202 (Figs. 1, 2 and 3), which, at every backward displacement of a denominational lever or jack 128, catches over a shoulder 203 (Fig. 1) formed on an arm 204 extending rearwardly from the cross bar 29 of the general operator; this hook extends forwardly from the rock shaft 149 to which it is secured, which shaft carries the universal bar or bail 147 immediately in front of the lugs 138, which thrust forwardly the denomination pin-bars 28, as explained. Hence, whenever the carriage stands in a position corresponding to an effective denominational column in a computing zone, one of the lugs 138 will be held in its forward position by the associated jack or lever 128, so that not only will the accordant denominational pin-bar 28 be in a position ready to have the pins set up thereon but the universal bail 147 will also be pressed forwardly and the hook 202 connected thereto held down in its locking position, thereby preventing the actuation of the general operator.

Since the present machine is arranged to compute in sterling money, no means are shown for making the hook 202 effective at pointing off spaces, that is, between pounds and shillings, shillings and pence, etc. This is so arranged because in computing in sterling money, the operative usually does not write zeros in the shillings and pence columns, but leaves said columns blank if no shillings or pence are to be added in. Thus it may often happen that the operative will want to operate the general operator after writing in the units of pounds column, the units of shillings column, or the units of pence column. The present structure permits this, but it prevents the operation of the general operator until the letter space column next succeeding the units of pounds column, the units of shillings column, or the units of pence column, is reached; these letter spaces are frequently used for punctuation. Inasmuch as the typewriter carriage has to traverse all the letter spaces making up the denominations of each kind of numerical units written and registered, it might be said that the hook or lock 202 is controlled by the typewriter carriage to prevent the actuation of the general operators until the digits representing a number in any one kind of unit have been completely written and registered. One particular utility of the hook 202 will be apparent when the devices for recording ten and eleven pence are examined.

One object of the hook 202 is to prevent operating the general operator when there is any possibility of the racks 36 or 59 failing to mesh with the gears 37 on the computing wheels. This might happen if the general operator were actuated while a pin-bar 28 is in its pin-setting position, for then the computing wheels would be moved against said racks while one of the racks was offset with the teeth thereof out of register with the teeth on the pinions 37 carried by the computing wheels. The displacing of a rack, however, as has been pointed out, locks the general operator, thus making such malaction impossible.

The frame 156, 157 is normally held by the springs 206 in such a position that the selector bars or levers 128 therein will properly coöperate with the dogs or tappets 124. The point at which said frame is so held may be accurately adjusted by means of set screws 207ª, one at each side of said frame, which screws strike against the top of the mount 155 which is fixed upon the machine frame. The springs 206 must be strong enough to hold the frame with its selector bars 128 in effective position when said selector bars are being operated against the tension of the springs 145 and 150, and for the purpose of adjusting the tension of springs 206 notches are cut in arms 157, as seen in Fig. 4.

In addition to the key 61 whereby the bar 62 may be operated manually to set the machine for subtraction, means are also provided whereby the machine will automatically subtract in certain computing zones or columns and again return to addition after it has passed each subtraction zone or column. To bring about this result, there is provided a special dog 207 which is settable like the other dogs 124 along the rack bar 125; said special dog, as seen in Figs. 3, 47, 48 and 49, includes a cam bar extension 208 which coöperates with a subtraction lever 209, said lever being pivoted on the rod 129 as are the denomination levers 128. When the traveling carriage brings the subtraction dog 207 opposite to the subtraction lever 209, the cam plate 208 thereon strikes its beveled portion 210 against the beveled cam face 211 at the top of the subtraction lever 209, thereby swinging said lever rearwardly around the pivot 129, so that the lower end 212 thereof moves forwardly a link 213, so as to cause a rock arm 214 at the forward end of said link to swing a rock shaft 215 to which said arm 214 is fast, (said rock shaft 215 being journaled in the side plates 135ª of the transposition devices) thereby releasing a catch 216 fast on said shaft from engagement with a notch 243 in a slide 217 which controls the subtraction bar 62 (Figs. 4 and 36). When said catch 216 is released, as described, it allows the slide 217 to be drawn rearwardly by a spring 218, thereby drawing the subtraction bar 62 rearwardly by means of a pin 219 fast on the subtraction bar, said pin riding in a slot 220 on said slide 217. It is to be noted at this point that the spring 218 is much stronger than the spring 115 which returns the subtraction rod 62, so that the latter spring will not interfere with the operation of the spring 218 in retrieving the slide 217 to set the mechanism for subtraction.

It will be seen that this automatic drawing of the subtraction bar 62 has precisely the same effect on the computing mechanism as the manual operation of said bar. With the operation of the general operator, said bar is restored precisely as if the subtraction had been manually set.

In order to retension the spring 218 and prevent its interference with the spring 115 in returning the mechanism to its adding condition, the cross bar 29 of the general operator just before the end of its forward movement, catches a lug 247ª fast on the slide 217 and draws said slide along to the position seen in Fig. 36, where the catch 216 will be drawn by a spring 241 once more into the notch 243 by which the catch usually holds said slide, and so reset the automatic subtraction device to its normal position. The cam plate 208 is of sufficient length or magnitude to continue in engagement with the part 211 of the subtraction lever 209 for the full width of the computing zone or column in which it is desired to subtract. The spring 241 normally draws the catch 216 to effective position against the slide 217, and also holds the subtraction lever 209 in position where it will be struck by the cam plate 208 in the letter-feeding movement of the carriage.

It will be observed that since the subtraction lever 209 is pivoted in the same manner as are the denomination selecting levers 128, said subtraction lever will be thrown to a position clear of the cam bar 208 by the same devices that silence the levers 128, so that on a return, tabulating or back-spacing movement of the carriage, said subtraction lever will not interfere with any part of the typewriter carriage.

In addition to setting the computing mechanism for subtraction, the subtraction bar 62 may automatically change the ribbon mechanism of the typewriter so that it will write in a different color; for example, if the typewriter ordinarily writes black, it may be arranged to write red when subtracting. For this purpose the bar 62 may be provided with a cam arm 221 which, when said subtraction bar is shifted rearwardly, strikes a rock arm 222 fast on a rock shaft 223, thus swinging another rock arm 224 fast on said shaft to move a link 225 upwardly by a pin-and-slot connection 281, said link being connected to operate the usual ribbon-shift mechanism of the Underwood typewriting machine; said ribbon mechanism includes an actuator 226 slidable laterally on the universal bar 13 of the typewriter, but always vibrating forwardly and rearwardly with said universal bar.

Said actuator includes walls 227 and 228 each having therein a slot so positioned that when the actuator is shifted to either of its extreme positions, one of said slots will engage one of two wrists 229, said wrists being fast on a ribbon-vibrating lever 230 pivoted between its ends. This lever, at every backward movement of the universal bar 13, is swung by a wrist 229 to raise a vibrator 231 through which the ribbon 232 at the top is carried. Said ribbon will bring its upper black stripe 233 between the type and the platen whenever the actuator engages the wrist remote from the pivot of the vibrating lever 230 by means of its wall 228, while if said actuator engages the wrist near the pivot of said lever by its wall 227, it will bring the lower red stripe 234 of said ribbon between the type and the platen, thus causing the typewriting mechanism to write in red.

The connections for shifting the actuator to thus shift the ribbon include a link 235 extending from the actuator toward the right-hand end of the machine, said link being pivoted to an arm 236 fast to a forwardly-extending rock shaft 237, on which rock shaft are fast, on opposite sides, a red key 238 and a black key 239, the connections being such that when the red key is depressed, the ribbon 232 in writing will write red, while if the black key 239 is depressed, the ribbon will write black. A spring 282 normally holds the shaft 223 and the ribbon mechanism corresponding to the writing of black, except when the subtraction bar is set.

The machine thus far has been described as suited both for decimal computation and for any other ordinary system of computing. The present machine as shown will compute in sterling money, namely, pounds, shillings, pence and farthings. The computation of pounds and units of shillings calls for no description beyond what is given of ordinary decimal computation, in which each wheel bears the ten digits "0" to "9" and carries over into the adjoining wheel every time it brings its dial wheel to read zero. The pin bars 28 for pounds and for the units column of shillings are shown in Figs. 12 and 14, each comprising nine pins, which are set in the usual manner which has been described above.

The pin-bar for computing in tens of shillings never has to register any digit except "1," which represents ten shillings; therefore, said pin-bar requires only a single settable pin thereon, said pin being shown in Figs. 13 and 15 at 244.

In place of the remaining eight pins such as are used on the pin bar seen in Fig. 12, there may be formed on the tens of shillings pin bar a series of lugs 245 integral with said pin bar. Since these lugs are integral with the bar, they will prevent the operation of the numeral keys corresponding to the several lugs when the bar is displaced forwardly for pin-setting but permit the bars 26 to pass idly therebetween at all other times. This pin bar, therefore, prevents the operation of any numeral key except the "1" key in the column where tens of shillings are recorded; a top view of said bar is shown in Fig. 15.

The pin bar for tens of shillings has an addition rack 246 and a subtraction rack 247 corresponding to the addition and subtraction racks 36 and 59 on the ordinary pin bars, but said racks are short since said bar never has a long travel.

The tens of shillings computing wheel 248 has a carry-over tooth 77 corresponding for every two unitary movements of said wheel, representing twenty shillings or one pound, so that it will carry over at every alternate step movement of the computing wheel 248. The numbering on said wheel 248 is shown in projection at A in Fig. 46. The units of shillings computing wheel and pin bar, as has been above stated, may be identical with the pounds pin bar.

At this point it may be remarked that since the pin-setting bars 26 preferably extend straight across the machine, the general operator will drive each pin-bar to the same extent when a pin in the same position has been set up thereon by the same linkage and pin-setting bar 26.

It, therefore, becomes necessary in the present construction to make the number of teeth twelve in the pinions 37 and 79 of the pence wheel, so that said wheel will be turned thereby in twelfths of a revolution instead of tenths (see Fig. 16 compared with Fig. 17).

There is but one pence wheel (see B, Fig. 46), the units and tens portions thereof being integral with each other so as to rotate as a unit. The pence from "0" to "11" pence are indicated on this wheel. Only the units of pence rack bar is capable of driving this wheel directly as it is provided with racks 36, 59, while the tens of pence rack bar is plain and unprovided with the racks 36, 59 for computing wheel pinions 37.

If only units of pence are being registered (i. e., from "1" to "9"), the pins 27 on the units of pence bar 28 (Fig. 8) are set up in the usual manner described at the beginning of the present specification. For computing ten and eleven pence special means are provided actuable by the regular "0" and "1" keys, so that the use of any special key in a typewriter, such as is common in the art, is avoided.

It may be remarked at this point that since the only numbers ever written in pence above the digit "9" are the numbers "10" and "11," if any digit is written in the tens of pence column, it must be the digit "1," and the only digit in the units column which will follow this "1" will be "0" or "1."

Mechanism is provided for utilizing this sequence of digits in pence. The "0" key of the typewriter and the "1" key of the typewriter are connected to special pin-setting linkages 26, which, by their coöperation, enable step movements of the pence wheel corresponding to ten and eleven pence, respectively. According to the mechanism herein disclosed, the writing of a "1" in the tens of pence column automatically sets the computing mechanism to register eleven pence, while the operation of the same key in the units column immediately following the first operation will have no effect on the computing mechanism. Thus it will be seen that writing "1" in the tens column takes care of registering eleven pence, but, on the other hand, if it is desired to write ten pence, the operation of the "0" key will wipe out the first setting for a movement corresponding to eleven pence in the computing mechanism, but sets a tenth pin on the units pin-bar corresponding to a movement of ten steps, so that it will compute ten pence.

To bring about this result, the tens of pence pin-bar 28 has thereon a single settable pin 249 (Figs. 9 and 10), which is here shown as a plunger comprising a lug 250, the utility of which will presently appear. Whenever the "1" typewriter key is operated in the tens of pence column, it depresses and sets the pin 249 by means of a special one of the pin-setting bars 26, indicated specifically at 257, which except in said column, normally moves idly whenever the "1" typewriter key is operated. Said idle pin-setting bar 257, as best seen in Fig. 9, is identical with the other bars 26, and is the farthest to the rear of these bars 26, so as to be superjacent solely the pin 249, which is located to the rear of any of the pins on any of the other pin-bearing bars, in order to correspond to a movement of eleven steps of the tens of pence bar, and, as will be seen later, of the units of pence bar. The bar 257 corresponds in form and connection to the bars 26 for setting pins of other digit values, and is connected in the usual manner by the bell cranks 24 and 25 to the connecting link 23, which is likewise operated in the usual manner by an arm 21 carried by the rock shaft 20 corresponding to the digit "1". The rock shaft of the "1" key, therefore, has two bell crank arms 21, each operating a pin-setting bar 26 (Figs. 2 and 5), one for setting a pin 27 on any of the pin-bars corresponding to "1" and the other for setting the pin 249 when "1" is struck in the tens of pence column.

In setting up the pin 249, the lug 250 thereon swings a walking beam 251 around its center so that the opposite end thereof raises a restoring pin 252 also on the tens of pence pin-bar, which last-named pin normally is alined with a supplementary pin-setting linkage 253. The pin-setting linkage 253 is operated by the "0" key precisely as are the other linkages 23 by the other digit keys but in the units of pence column.

The pin 249 is so placed that if the general operator comes forwardly and strikes it, it will carry the tens of pence pin-bar forwardly eleven spaces to compute eleven pence. Said pin-bar, however, has no rack by which it engages the pence computing wheel, but it turns said pence wheel indirectly by means of the units of pence bar, which latter, as seen in Fig. 8, has the usual addition rack 36 and the usual subtraction rack 59. The connection by which the tens of pence pin-bar drives said units of pence bar comprises a lug 254 fast on the side of the tens of pence bar, which lug lies behind a lug 255 on the units of pence pin-bar. The result of this is that whenever the tens of pence bar is carried along by its pin 249, it drives the units of pence bar in front of it to an extent which will record eleven units.

If a "1" has thus been written in the tens of pence column, the computing mechanism will be set to enable, as stated, the pence wheel to be turned a distance corresponding to eleven pence and a "1" may be recorded in the units of pence column without further effect on the computing mechanism, for, as above stated, the units of pence bar will be carried along by the connections between it and the tens of pence bar. If, however, it is desired to write ten pence, viz., register a "0" in the units of pence column, the "0" key, by means of a linkage, comprising a pin-setting bar 26, specifically designated 257ª, will set a pin 352, as seen at Fig. 37, on the units of pence bar, said pin being so located that when set, the general operator, by engagement with this pin, will carry the pin-bar sufficiently to turn the pence wheel ten-twelfths of a revolution. In Fig. 37 the right-hand or "1" pin is indicated in its set position, such setting having been effected by operation of the "1" key when setting pin 249 on the tens of pence bar, but this setting will be ineffective, the movement of the bar being controlled by the setting of the tens pin 352. In thus setting the tens pin on the units pence bar, as in Fig. 37, another usually idle linkage 253 at the same time strikes the pin 252 on the tens of pence pin-bar with which it normally is alined, as seen in Fig. 9, and thereby restores the pin 249 to ineffective position, thus making the tens of pence bar for the time being ineffective. The result of this is that if ten pence have been written and registered, the general operator in coming forward moves the units pin-bar sufficiently to turn its computing wheel ten-twelfths of a revolution, while the tens pin-bar remains idle. The hook 202 described above, prevents operating the general operator while in the units of pence column after writing "1" in the tens of pence column before passing to the letter-space column next succeeding the units of pence column.

It will also be noted that the units of pence bar will be moved to pin-setting position when the tens of pence bar is so moved, and this will result in setting the "1" pin on the units of pence bar when the pin 249 is set on the tens of pence bar. The setting of this "1" pin will not have any effect on the computing, since the general operator will drive its pin-bar either by the tens of pence bar or by the "10" pin on the units of pence bar.

The tens of pence pin-bar, it will be observed in Fig. 9, has a series of integral lugs 256 thereon, which prevent the operation of any numeral key, except the "1" key, when in the tens of pence column. These lugs prevent the operation of the other keys because the lugs stand, when computing is being done in that column, directly under the linkages and the pin-setting bars 26, but will not yield when said bars begin to move under the depression of a numeral key.

In addition to computing in pounds, shillings and pence, the present machine is adapted also to compute in farthings. The farthings, however, are expressed in fractions of a penny, that is, one-half, one-quarter and three-quarters of a penny. The farthings or fractional pence wheel, as seen at C, Fig. 46, in projection, is arranged so that it registers from "0" up to three-quarters of a penny three times in each revolution of said farthings wheel; that is to say, for every farthing or quarter of a penny computed, the wheel is turned one-twelfth of a revolution. Since, however, the farthings wheel is never turned more than three steps corresponding to three-quarters of a penny in any one operation of the general operator, the addition rack 36 and the subtraction rack 59 of said farthings pin-bar may be short, as seen in Fig. 7.

Since four farthings make one penny, there are never more than three-quarters of a penny added in at one computation, and so the farthings pin-bar, as seen at Fig. 7, includes only three settable pins 27 and has integral lugs 256 thereon for preventing the operation of the pin-setting bar 26 of any numeral key except the "1," "2," and "3" keys, which are arranged to print in upper case, the fractions "¼," "½" and "¾."

In order to prevent "0" from being written in the farthings place which might be misleading, the farthings pin-bar includes a lug 291, which, like the lugs 256, prevents operation of the "0" key in the farthings place, because said lug stands under the "0" pin-setting bar 26 (see Figs. 5 and 7).

The farthings computing wheel, as seen in Fig. 55, has three carry-over teeth 77, since three times in each revolution it completes a cycle or runs up the exchange value between the farthings wheel and the pence wheel, which exchange value is four to one. Therefore, the farthings wheel is turned in twelfths of a revolution, so that, like the pence wheel, its pinion 37 has twelve teeth.

The carry-over devices for the farthings and the pence wheels differ only from the carry-over devices described in broad terms above, in that the carry-over gears 79 thereon comprise twelve teeth instead of ten, and the pitch of the carry-over pawls 78 if necessary may be varied to suit the different number of teeth.

As seen in Fig. 19, the farthings are arranged to be printed by the upper case of the numeral keys and are expressed in fractions of a penny. Thus the upper case of the key "1" prints one-quarter of a penny corresponding to one farthing; of the key "2" prints one-half of a penny corresponding to two farthings; and of the key "3" prints three-quarters of a penny corresponding to three farthings. To enable the upper case thus to be used, each type-bar comprises lower-case type 260 and upper-case type 261, said lower-case type being normally effective on the platen, but when the platen is shifted by the usual platen shift rail 262 by connections (not shown herein) from the shift key 263, said upper-case type coöperate with the platen and print on the work-sheet.

Provision is also made of means to prevent the clashing of the general operator with any of the pin-setting linkages including the bars 23, 26, should any of these linkages be in their depressed position when the general operator starts in motion. That is to say, the general operator is provided with means for lifting any such accidentally-depressed pin-setting linkages, whether owing to the actuation of a numeral key at the wrong time or otherwise, as it starts in motion and before it can possibly clash therewith. For this purpose, there is provided underlying the pin-setting bars 26, as best seen in Figs. 40 and 45, a bar 265 which is pivoted by means of pins 268 to the frame 266 in which pin-setting bars are carried so that a cam 267 fast at one side of the general operator will raise said bar 265 when the general operator comes forward, thus raising any depressed pin-setting bar 26. The front bar 268ᵃ of the frame 266 on which the shafts 20 are journaled, is cut away at 268ᵇ to permit the bar 265 to thus rise.

The operation of the pin-restoring plate 108 has been described above. In Fig. 44 is shown the relation of said plate to the pin 249 on the tens of pence bar, and from said figure it will be apparent that when the pin-restoring plate 108 rises to restore the pins 27, at the same time said plate will strike a lug 270 on the walking beam 251, thereby raising the pin 249 to position so that it will be struck by the supplementary pin setting bar 26, and at the same time the walking beam carries the restoring pin 252 down to ineffective position.

In order to prevent overthrow of the pin-bearing rack bars 28 during their forward movement under the direction of the general operator, there is provided on the general operator, a cam 272, which, as the general operator approaches the end of its forward stroke, comes into engagement with the end of the arm 273 to rock the same and thus rock a shaft 275 to which the arm is secured. The rock shaft 275 has also fast thereon, one or more arms 274, which carry a cross bar 276 arranged to be raised as the general operator reaches the forward limit of its stroke, into the path of the set pins 27 on the rack bars 28, preventing their further movement as seen in Fig. 38.

Inasmuch as the units of pence pin-bar when driven by the tens of pence bar may not have a pin set thereon which would be stopped by this cross bar 276, there is provided in the units of pence bar, a lug 277 (Fig. 8), which will stop the units of pence bar as it reaches the extremity of its throw, by striking against the comb 121. The tens of pence bar may be provided with a lug 290 for the same purpose.

In connection with the units of pence bar, when computing eleven pence, the "1" pin will be set on the units of pence bar 28 at the same time that the pin 249 is set on the tens of pence bar, as both the units and tens of pence bars are connected to move forwardly when computing in the tens of pence denominational column. Now, inasmuch as the units of pence pin bar, during a subsequent forward motion of the general operator, will advance eleven steps, this "1" pin will still be set up, and on a subsequent return motion of the general operator, because of the shortness of the pin-restoring plate 108, will not come within the sphere of influence of this plate in time, as the latter must act and return to its normal ineffective position before the general operator ceases its motion. There is, therefore, provided a supplementary pin-restoring plate 271 (Fig. 38), which is located on one of the arms 274 carrying the overthrow limiting bar 276. This pin-restoring plate 271 is located in the path of the "1" pin on the units of pence rack bar, so as to be brought up into engagement with this pin and unset the same at the end of the forward motion of the general operator. It will hence be unnecessary for this pin to return within the sphere of the main pin-restoring plate 108 before the same has acted.

Variations may be restored to within the scope of the invention, and portions of the improvements may be used without others.

Having thus described my invention, I claim:

1. In a combined typewriting and computing machine, the combination with numeral keys and a traveling carriage, of computation members on which numerals are set up as said numeral keys feed said carriage, computing wheels, a general operator for carrying the numbers so set up into said computing wheels, a subtraction member settable to cause said computation members to turn said computing wheels to subtract, means for automatically returning said setting to cause the computing wheels to add on the next operation of said general operator, and means for preventing said automatic addition setting during a predetermined zone of the travel of said carriage.

2. In a combined typewriting and computing machine, the combination with numeral keys and a traveling carriage, of computation members on which numbers are temporarily set up by said numeral keys as they feed said carriage along, computing wheels, a general operator for carrying the numbers so set up into the computing wheels, means on said carriage for determining on which computation member a number shall be set up at each position of the carriage, means for preventing an operation of said general operator and means whereby said preventing means is controlled by the carriage.

3. In a combined typewriting and computing machine, the combination with numeral keys and computing wheels, of computation members for registering in pounds, shillings and pence numbers written by said numeral keys during the feeding of the carriage, a general operator for carrying the numbers so set up into the computing wheel, selecting means controlled by the carriage for determining in what denomination a given number shall be set up, said denomination means being ineffective at points between pounds and shillings and shillings and pence, and means for preventing the operation of said general operator in the computing zone, said means ineffective at such between-points.

4. In a combined typewriting and computing machine, the combination, with numeral keys and computation members on which numbers are temporarily set up by said keys, of a general operator to be operated after the entire number is set up by the keys, computing wheels into which the numbers after being set up are carried by said general operator, a traveling carriage, and means settable to enable said carriage to select the zone in which numbers are set up and for simultaneously making said general operator inoperable before the end of the same zone is reached, to prevent premature operation of said general operator.

5. In a combined typewriting and computing machine, the combination with numeral keys and computation members comprising settable members thereon, of computing wheels, a general operator for carrying numbers set up in said computation members into said computing wheels, and means operated by said general operator for positively moving to its normal ineffective position any obstructing key-actuated part so as to permit the free action of the general operator.

6. In a combined typewriting and computing machine, the combination with numeral keys and computing members comprising settable members thereon, of computing wheels, a general operator for carrying numbers set up in said computation members into said computing wheels, setting bars extending transversely of said computation members adapted to be moved by the numeral keys to coöperate with the settable members thereon, and means connected to the general operator for positively moving said setting bars to their ineffective positions when said general operator is operated.

7. In a combined typewriting and computing machine, the combination with numeral keys and computing members comprising settable members thereon, of computing wheels, a general operator for carrying numbers set up in said computation members into said computing wheels, setting bars extending transversely of said computation members adapted to coöperate with the settable members thereon, setting bars extending transversely of said computation members for setting the settable members thereon, a bar universal to all said setting bars underlying them, and a cam forming part of said general operator for lifting said universal bar to carry said setting bars to ineffective position when said general operator is operated.

8. In a computing machine, the combination with numeral keys and computation members, of pins settable on said computation members, setting bars controlled by the numeral keys for setting said pins, a general operator, means controlled by the general operator for positively restoring any setting bar by operation of said general operator, and an overthrow bar moved by the final movement of said general operator into engagement with the set pins to positively arrest each computation member by its pin set thereon.

9. In a combined typewriting and computing machine, the combination with numeral keys and a traveling carriage, of computation members in which numbers are temporarily set up by said numeral keys, computing wheels, a general operator for carrying numbers so set up into said computing wheels, a rack bar on said traveling carriage, denomination selecting dogs settable on said rack bar, an extension of one of said dogs for causing said wheels to subtract as said general operator operates, means for automatically restoring the mechanism to add by said general operator, and a member on said subtraction dog for preventing the return of the subtracting mechanism to adding position within a predetermined zone of the travel of said carriage.

10. In a combined typewriting and computing machine, the combination with numeral keys and a traveling carriage, of computation members in which numbers are temporarily set up by said numeral keys, computing wheels, a general operator for carrying numbers so set up into said computing wheels, a rack bar on said traveling carriage, denomination selecting dogs settable on said rack bar, an extension of one of said dogs for causing said wheels to subtract as said general operator operates, means for automatically restoring the mechanism to add by said general operator, a member on said subtraction dog for preventing the return of the subtracting mechanism to adding position within a predetermined zone of the travel of said carriage, denomination selecting levers operated by said dogs, a carrier for said selecting levers, a subtraction determining lever mounted in said carrier for coöperation with said subtraction dog, and means for moving said carrier to a position free of said dogs.

11. In a combined typewriting and computing machine, the combination with ten digit keys ranging from "0" to "9," of a computing wheel for registering twelfths, means for causing the "1" key when operated in the tens of twelfths column to set up eleven-twelfths to be carried into said twelfths wheel, and means for causing the "0" key when operated in said units of twelfths column to eliminate the eleven-twelfths setting and set up ten-twelfths to be carried into said twelfths wheel.

12. In a combined typewriting and computing machine, the combination with a traveling carriage and ten digit keys ranging from "0" to "9," of a twelfths computing wheel, a computation member for the tens of twelfths column, a computation member for the units of twelfths column, means settable on said computation members for registering thereon the digits written, means whereby when the "1" key is operated in the tens of twelfths column it sets up eleven-twelfths, and means whereby when the "0" key is operated in the units of twelfths column, it changes the setting from eleven- to ten-twelfths.

13. In a combined typewriting and computing machine, the combination with a wheel adapted to register in twelfths, of a series of digit keys ranging from "0" to "9," a pin bar for the tens of twelfths, a pin bar for the units of twelfths, a single pin settable on the tens of twelfths bar, ten pins settable on the units of twelfths bar, a connection whereby the tens of twelfths bar turns the computing wheel through the units of twelfths bar, means whereby the "1" key when operated in the tens of twelfths column sets the single pin on said tens of twelfths bar, and means whereby the "0" key when operated in the units of twelfths column unsets said tens of twelfths bar pin and sets a pin corresponding to "10" on said units of twelfths bar.

14. In a computing machine, the combination with a wheel adapted to register in twelfths, of a series of digit keys ranging from "0" to "9," a tens pin bar, a units pin bar for the twelfths wheel, a single pin settable on said tens pin bar, means connected to the "1" key for setting said pin, a lug on said tens pin bar engaging a similar lug on the units pin bar, so that the units pin bar will be driven by said tens pin bar if said single pin is set, a connection from the "0" key for unsetting said pin and setting a pin corresponding to "10" on the units pin bar, and a general operator for driving said bars by any pin which is set for carrying the number so recorded into the twelfths wheel.

15. In a computing machine, the combination with computing wheels and rack bars comprising settable pins, of means for temporarily registering numbers in said rack bars by setting said pins, numeral keys, a traveling carriage on which numbers are printed as set up, means controlled by said carriage for displacing said rack bars, a general operator for carrying numbers registered in said rack bars into the computing wheels, and a lock holding said general operator against operation, said lock made effective by any displaced rack bar.

16. In a combined typewriting and computing machine, the combination with digit keys ranging from "0" to "9," of pin bars on which digits are set up by said keys, a pin bar having ten pins thereon, a pin bar having a pin thereon settable by one of said digit keys, means for driving said first-named pin bar by said second-named pin bar, and means for restoring a pin on said second-named pin bar when a certain pin is set on said first-named pin bar.

17. In a computing machine, the combination with computing wheels and rack bars, of pins settable on said rack bars for determining how far said computing wheels shall turn, solid bearings on which said rack bars slide, bars extending transversely of said rack bars for so setting said pins, said pins being normally out of pin-setting position, means for selectively sliding said rack bars to cause the pins to register with the setting bars, and lugs integral with said rack bars for preventing the operation of a pin-setting bar in an impossible digit on the bar.

18. In a combined typewriting and computing machine, the combination with an array of numeral keys ranging from "0" to "9," of computing wheels arranged to register sterling money including farthings, a case shift mechanism by which certain of said keys print farthings as fractions of a penny, and means for preventing the operation in the farthings column of any printing key which will compute anything except one, two or three farthings.

19. In a combined typewriting and computing machine, the combination with an array of numeral keys ranging from "0" to "9," of computing wheels for computing in sterling money including farthings, an item register in which numbers are temporarily registered as written by said numeral keys, and means for preventing the operation of any numeral key which will print anything except one, two or three farthings in the farthings column.

20. In a computing machine, the combination with an array of digit keys ranging from "0" to "9," of a computing wheel for computing in twelfths, two rack bars, having settable pins, for rotating said twelfths wheel, means for preventing the operation of any numeral key except the "1" key when operated at said rack bar to set pins to register eleven twelfths, and means for causing the "0" key when operated at the second rack bar to eliminate said setting and register ten twelfths.

21. In a combined typewriter and computing machine, the combination with numeral keys, a traveling carriage and computing wheels, of a rack bar in said traveling carriage, dogs settable on said rack bar to determine in which denomination a number written shall be computed, and an extension of one of said dogs to cause said computation to be subtraction.

22. In a combined typewriter and computing machine, the combination with numeral keys, a traveling carriage and computing wheels, of a rack bar in said traveling carriage, dogs settable on said rack bar to determine in which denomination a number written shall be computed, and an extension of one of said dogs to cause said computation to be subtraction, said extension covering a whole column in which computing is done, thus holding the mechanism in its subtraction position.

23. In a combined typewriting and computing machine, the combination with numeral keys, a traveling carriage and computing wheels, of a rack bar in said traveling carriage, dogs settable on said rack bar to determine in which denomination a number written shall be computed, and an extension of one of said dogs to cause said computation to be subtraction, said extension formed as a bar parallel to said rack bar and extending through as many letterspaces as a computation will cover.

24. In a computing machine, the combination with pin bars having settable pins thereon, of a pin bar having a pin adapted to be unset by the setting of a pin on another bar.

25. In a combined typewriting and computing machine, the combination with numeral keys and a traveling carriage, of computing wheels into which numbers are to be carried after being written on said carriage, rack bars having pins by which the numbers are temporarily registered, teeth on said rack bars adapted to mesh with pinions on said computing wheels, means controlled by said traveling carriage for shifting said rack bar to move the pins from their normal ineffective position into a position where they may be set thus moving the bars where their teeth might fail to mesh with the computing wheel pinions, a general operator for driving said bars to an extent determined by the pins sets to carry the numbers into said wheels, and a lock for holding said general operator against movement during the selection of any of said rack bars.

26. In a computing machine, the combination with computing wheels and numeral keys, of rack bars normally adapted to mesh with said computing wheels, means for registering a number on any rack bar by the operation of a numeral key when said rack bar is not in meshing position, a general operator for carrying the numbers so registered into said computing wheels, and a lock holding said general operator when any rack bar is not in meshing position.

27. In a computing machine, the combination with digit keys, of pin bars, no bar having more pins than the number of said keys, twelve linkages controlled by said keys, and means for registering numbers greater than the number of pins on any one pin bar by the operation of twelve linkages.

28. In a combined typewriting and computing machine, the combination with numeral keys and a traveling carriage, of a rack bar forming part of said carriage, a computing mechanism beneath said keys, denomination dogs settable on said rack bar, a lever for each denomination adapted to be moved by said dogs, said levers extending downwardly to said computing mechanism, means for temporarily registering numbers by the operation of said numeral keys and said selector levers, computing wheels, a general operator for carrying the numbers so registered into said wheels, and a universal bar adjacent the lower end of each selector lever for locking said general operator.

29. In a computing machine, the combination with members on which numbers are temporarily set up, of keys for so setting said numbers, means for setting a number sometimes too large by the operation of a key, and means for erasing said number by the operation of a second key when a smaller number is to be set up.

30. In a computing machine, the combination with members having settable pins, of means for setting said pins, and means for restoring one pin by the setting of another on another member.

31. In a computing machine, the combination with members on which decimal numbers are registered, of members on which non-decimal numbers are registered, and means for setting up said numbers by decimal keys, said means comprising devices for erasing a number which would be erroneously computed as set up said keys.

32. In a computing machine, the combination with a system of settable devices on which a number may be set up, of a series of registering devices into which numbers so set up may be carried, setting linkages for setting said settable devices, a general operator acting to carry into said registering devices the numbers as determined by said settable devices, and means for preventing the clashing of said general operator with said setting linkages.

33. In a computing machine, the combination with a system of settable devices on which a number may be set up, of a series of registering devices into which numbers so set up may be carried, setting linkages for setting said settable devices, a general operator acting to carry into said registering devices the numbers as determined by said settable devices, and means for preventing the clashing of said general operator with said setting linkages should any happen to lie in the path of movement of said general operator.

34. In a computing machine, the combination with a system of settable devices on which a number may be set up, of a series of registering devices into which numbers so set up may be carried, a general operator for operating all of said registering devices in proportions corresponding to the settable devices set, linkages for setting said settable devices, and a bar universal to said setting linkages for shifting the same to ineffective position.

35. In a computing machine, the combination with a system of settable devices on which a number may be set up, of a series of registering devices into which numbers so set up may be carried, a general operator for operating all of said registering devices in proportions corresponding to the settable devices set, linkages for setting said settable devices, and a bar universal to said setting linkages for shifting the same to ineffective position during a movement of said general operator.

36. In a computing machine, the combination with a system of settable devices on which a number may be set up, of a series of registering devices into which numbers so set up may be carried, a general operator for running up numbers determined by the set ones of said settable devices into said registering devices, a series of setting linkages for setting said settable devices, and a bar universal to all of said setting linkages and actuated by said general operator during a movement thereof to return any and all of said setting linkages to their ineffective position clear of the path of movement of said general operator.

37. In a computing machine capable of computing in an irregular valuating system in which the exchange values from order to order vary, the combination with a system of settable devices arranged in orders, the settable devices of which orders vary in number according to the exchange value between each particular order and the next higher order and on which a number may be set up, a series of registering devices into which numbers so set up may be carried, a general operator engaging the set ones of said settable devices to run up the numbers set up, into said registering devices, a series of setting linkages universal to all of the orders of said settable devices, and a series of obstructing members varying in number in each order as the complement of the number of settable devices in each order using the number of setting linkages as a base, so as to prevent the operation of setting linkages in any particular order corresponding to values of settable devices other than those existing in the particular order in action.

38. In a computing machine capable of computing in an irregular valuating system in which the exchange values from order to order vary, the combination with a system of settable devices arranged in orders, the settable devices of which orders vary in number according to the exchange value between each particular order and the next higher order and on which a number may be set up, a series of registering devices into which numbers so set up may be carried, a general operator engaging the set ones of said settable devices to run up the numbers set up, into said registering devices, a series of setting linkages universal to all of the orders of said settable devices, a series of obstructing members varying in number in each order as the complement of the number of settable devices in each order, using the number of setting linkages as a basis, so as to prevent the operation of setting linkages in any particular order corresponding to values of settable devices other than those existing in the particular order in action, said settable devices and said obstructing members being normally out of register with said setting linkages, and means for bringing said settable devices and said obstructing members in each order *seriatim* into register with said setting linkages.

39. In a computing machine, the combination with a series of registering devices, of a series of denominational members coöperating with said registering devices to run up numbers therein, a system of settable devices divided into orders, one order for each of said denominational members and located thereon so as to determine when set the extent of movement of the individual denominational members, setting mechanism for said settable devices, said setting mechanism and said settable devices being normally out of effective reach of each other, spaced teeth on said denominational members permitting the idle action of any of the parts of said setting mechanism with respect to any of said denominational members when in their passive or normal position, and means for bringing said settable devices and said teeth within reach of the parts of said setting mechanism in bringing a denominational member to an active position so as to enable the setting of the settable devices thereon by an actuation of corresponding parts of the setting mechanism, at the same time bringing said teeth into the path of movement of other parts of said setting mechanism corresponding to setting devices other than those found in each particular order, so as to prevent the actuation of said latter parts of said setting mechanism.

40. In a computing machine, the combination with a system of settable devices on which a number may be set up, of a series of registering devices into which the number so set up may be carried, a series of setting linkages for setting said settable devices, a system of obstructing lugs for preventing the actuation of certain ones of said setting linkages, said lugs being normally located in an ineffective position, and means for bringing certain groups of said lugs individually into action to obstruct the movement of certain parts of said linkages.

41. In a computing machine, the combination with ten digit keys ranging from "0"

to "9", of a computing wheel for registering twelfths, means for causing the "1" key when operated in the tens of twelfths column to set up eleven-twelfths to be carried into said twelfths wheel, and means for causing the "0" key when operated in said units of twelfths colunm to eliminate the eleven-twelfths setting and set up ten-twelfths to be carried into said twelfths wheel.

42. In a computing machine, the combination with a traveling carriage and ten digit keys ranging from "0" to "9", of a twelfths computing wheel, a computation member for the tens of twelfths column, a computation member for the units of twelfths column, means settable on said computation members for registering thereon the digits written, means whereby when the "1" key is operated in the tens of twelfths column it sets up eleven-twelfths, and means whereby when the "0" key is operated in the units of twelfths column, it changes the setting from eleven- to ten-twelfths.

43. In a computing machine, the combination with a wheel adapted to register in twelfths, of a series of digit keys ranging from "0" to "9", a pin bar for the tens of twelfths, a pin bar for the units of twelfths, a single pin settable on the tens of twelfths bar, ten pins settable on the units of twelfths bar, a connection whereby the tens of twelfths bar turns the computing wheel through the units of twelfths bar, means whereby the "1" key when operated in the tens of twelfths column sets the single pin on said tens of twelfths bar, and means whereby the "0" key when operated in the units of twelfths column unsets said tens of twelfths bar pin and sets a pin corresponding to "10" on said units of twelfths bar.

44. The combination with a computing mechanism capable of addition and subtraction, of a traveling carriage, printing devices, a series of denominational members under control of said carriage for selecting denominational orders of the computing mechanism that corresponds with similar orders of the printed columns, a member corresponding in its action to that of said denominational members and also under control of said carriage for automatically determing whether the computing mechanism shall add or substract, and means for simultaneously moving all of said carriage-controlled members to a position in which they are not subject to the actions of said carriage.

45. In a computing machine, the combination with a series of registering devices into which numbers may be run up, of a series of denominational members for running up numbers in said registering devices, each of said denominational members having one or more settable devices thereon to determine the extent of movement thereof, a system of setting linkages for setting said settable devices, said members being normally in a position such that the settable devices are out of effective reach with respect to said setting linkages, a general operator for driving said denominational members by engagement with the set ones of said settable devices, and locking means for preventing the actuation of said general operator when any one of said denominational members is in a position to have the settable devices thereon set by said setting linkages.

46. The combination with a series of computing wheels, of duplex driving elements for said computing wheels having duplicate but oppositely-acting driving sections for driving said computing wheels in opposite directions for addition and subtraction, a traveling member for determining denominational selections, state-controlling mechanism for determining which of said sections will drive said computing wheels, said last-mentioned mechanism reverting automatically to a predetermined state after acting to control another state, means for controlling said last-mentioned means from said traveling member, and means for preventing said automatic reversion during a predetermined zone of travel of said traveling member.

47. The combination with a plurality of computing wheels, of a reverse drive for said computing wheels for determining whether the computation shall be an adding or a subtracting one, a member traveling to effect denominational selections, state-controlling means operated from said traveling member to determine whether said drive shall rotate said computing wheels in one direction or the other, said drive normally reverting after one condition of drive to a normal state corresponding to another condition of drive, and means for preventing such automatic reversion during a computing zone as determined by the travel of said traveling member.

48. The combination with a plurality of computing wheels, of a reverse drive for said computing wheels for determining whether the computation shall be an adding or a subtracting one, a member traveling to effect denominational selections, state-controlling means operated from said traveling member to determine whether said drive shall rotate said computing wheels in one direction or the other, and means for silencing said control from said traveling member.

49. The combination with a plurality of computing wheels, of a reverse drive for said computing wheels for determining whether the computation shall be an adding or a subtracting one, a member traveling to effect denominational selections, state-controlling means operated from said traveling member to determine whether said drive shall rotate said computing wheels in one direction or the other, and means for silencing said control from said traveling member automatically during letter-space movements of said carriage.

50. The combination with a series of computing wheels, of a series of reverse-drive elements for said computing wheels, a series of jacks movable individually to advance said drive elements individually, a general operator for advancing said drive elements *en bloc* to drive said computing wheels, and shifting means for adjusting said jacks *en bloc* to silence the same.

51. The combination with a computing mechanism, of a subtraction-setting mechanism for said computing mechanism, a traveling carriage, a denomination controlling mechanism for according the denominations of said computing mechanism and the denominations of said carriage, a tappet for actuating said denomination controlling mechanism, connections to said subtraction-setting mechanism, and a dog carried by said tappet for actuating said connections to enable a subtraction setting of said computing mechanism.

52. The combination with a computing mechanism, of a subtraction-setting mechanism for said computing mechanism, a series of jacks for controlling the denominations of said computing mechanism, a traveling carriage, a tappet carried by said carriage for actuating said jacks, connections for actuating said subtraction-setting mechanism, and a dog carried by said tappet for actuating said connections to enable a subtraction setting of said computing mechanism.

53. The combination with a computing mechanism, of a subtraction-setting mechanism for said computing mechanism, jacks for controlling the denominations of said computing mechanism, a traveling carriage, a tappet carried by said carriage, a camming dog for engaging said jacks to actuate them one by one, connections to said subtraction-setting mechanism, and a camming dog mounted on said tappet and engaging said connections continuously during the period of operation of said jacks by said first-mentioned dog so as to enable a subtracting action of said computing mechanism.

54. The combination with a computing mechanism, of a subtraction-setting mechanism for said computing mechanism, a traveling carriage, tabulating mechanism for controlling the zones of said carriage, a trip carried by said carriage for bringing said subtraction-setting mechanism into play, and means for rendering said trip ineffective during a traveling movement of said carriage.

55. The combination with a computing mechanism, of a subtraction-setting mechanism for said computing mechanism, a traveling carriage, a dog carried by said carriage for bringing said subtraction-setting mechanism into play, tabulating mechanism for controlling the jump movements of said carriage to computing zones, said dog being effective to bring said subtraction-setting mechanism into play solely during the movement of said carriage in a letter-feeding direction, and means for rendering said dog ineffective during a movement of said carriage in a letter-feeding direction while said tabulating mechanism is in action.

56. The combination with a computing mechanism capable of existing under a plurality of states as to adding and subtracting, of a traveling carriage, a series of denominational members actuable from said carriage to determine the denominational columns of said computing mechanism to accord with those of said carriage, a member corresponding in action to that of said denominational members also operable from said carriage for controlling the state of said computing mechanism, and means for moving said denominational members and said state-controlling member concomitantly and bodily clear of said carriage to free the same from subservience to actuation from said carriage.

57. In a combined typewriting and computing machine; the combination, with a traveling carriage and a denomination-selecting device carried by said carriage; of denominational members operated by said device; computing wheels; subtraction connections for said wheels; a subtraction-setting member connected to said denomination-selecting device and effective on said subtraction connections; a back-space key for said carriage; connections whereby said back-space key makes said denomination and subtraction devices ineffective on the denomination and subtraction members; and means whereby the mechanism is restored to subtraction on release of said back-space key if it has shifted to adding while said back-space key is effective.

58. In a combined typewriting and computing machine; the combination, with a traveling carriage and a denomination-selecting device carried by said carriage; of denominational members operated by said device; computing wheels; subtraction connections for said wheels; a subtraction-setting member connected to said denomination-selecting device and effective on said subtraction connections; a back-space key for said carriage; a connection whereby said back-space key moves said denomination members and said subtraction member clear of the subtraction and denomination devices; and means whereby the subtraction mechanism is again made effective to subtract on release of the back-space key if it has shifted to addition while said key is effective.

59. In a combined typewriting and computing machine; the combination, with numeral keys and a traveling carriage; of computing wheels; means for temporarily registering the numbers written by said keys; a general operator for carrying said numbers either additively or subtractively into said wheels; a device for determining whether the number shall be added or subtracted; means whereby the actuation of the general operator restores the mechanism to adding from subtracting position; and a device for preventing actuation of said general operator while writing a number, thus preventing return to addition while writing a number.

60. In a combined typewriting and computing machine; the combination, with numeral keys and a traveling carriage; of computing wheels adapted to be driven to add or subtract; denominational members on which numbers are temporarily set up by said keys, said members adapted to be displaced *seriatim* for such setting up; a general operator for turning said wheels to an extent determined by said members; means preventing operation of said general operator, said means made effective by the displacement of said members; a device for causing said wheels to subtract; and means for making said subtraction device ineffective by actuation of said general operator, the connections being such that preventing the operation of the general operator prevents said subtraction device from being made ineffective during the setting up of a number.

61. In a combined typewriting and computing machine, the combination, with numeral keys and a traveling carriage; of computing wheels; means for temporarily registering the numbers written by said keys; a general operator for carrying said numbers either additively or subtractively into said wheels; a device for determining whether the number shall be added or subtracted; means whereby the actuation of the general operator restores the mechanism to adding from subtracting position; and a device for preventing actuation of said general operator while writing a number, thus preventing return to addition while writing a number, said subtraction device adapted to be controlled either automatically by travel of the carriage, or manually, at will.

62. In a combined typewriting and computing machine, the combination, with numeral keys and a traveling carriage; of computing wheels adapted to be driven to add or subtract; denominational members on which numbers are temporarily set up by said keys, said members adapted to be displaced *seriatim* for such setting up; a general operator for turning said wheels to an extent determined by said members; means preventing operation of said general operator, said means made effective by the displacement of said members; a device for causing said wheels to subtract; and means for making said subtraction device ineffective by actuation of said general operator, the connections being such that preventing the operation of the general operator prevents said subtraction device from being made ineffective during the setting up of a number; said subtraction device adapted to be controlled either automatically by travel of the carriage, or manually, at will.

63. In a combined typewriting and computing machine, the combination with a traveling typewriter carriage, computing wheels and typewriter numeral keys, of rack bars normally adapted to mesh with said computing wheels, pin bars forming parts of said rack bars and adapted to register a number at the operation of a numeral key, means controlled by said carriage for shifting said pin bars *seriatim* to a position where said keys will be effective thereon, a general operator for carrying the numbers so registered into said computing wheels, and a lock holding said general operator against actuation when any pin bar is shifted to a position where the numeral key will be effective on it.

64. In a combined typewriting and computing machine, the combination with a traveling typewriter carriage, computing wheels and typewriter numeral keys, of rack bars normally adapted to mesh with said computing wheels, pin bars forming parts of said rack bars and adapted to register a number at the operation of the numeral key, means controlled by said carriage for shifting said pin bars *seriatim* to a position where said keys will be effective thereon, a general operator for carrying the numbers so registered into said computing wheels, a lock holding said general operator against actuation when any pin bar is shifted to a position where the numeral key will be effective on it, subtraction devices for causing said wheels to subtract, means for making said subtraction devices ineffective by actuation of said general operator, and means for holding said subtraction devices effective within a computing zone independently of said lock.

65. In a combined typewriting and adding machine, the combination with a traveling typewriter carriage and computing devices, of a subtraction dog carried by said carriage, a subtraction lever coöperating with said dog, means normally preventing return of said carriage past said dog, a line-space lever for said carriage, and means operated by said line-space lever for simultaneously making said preventing means ineffective and carrying said subtraction lever clear of said dog to permit said carriage to pass.

66. In a combined typewriting and adding machine, the combination with a traveling typewriter carriage and computing devices, of a subtraction dog carried by said carriage, a subtraction lever coöperating with said dog, means normally preventing return of said carriage past said dog, a back-space key for said carriage, and means for making said preventing means ineffective on said carriage and for carrying said subtraction lever clear of said dog by actuation of said back-space key.

67. The combination with a register, a general operator therefor, and means actuable by said general operator for changing the condition of said register, of a condition-controlling shifter, a spring tending to actively throw said shifter, a latch to restrain said shifter, and a carriage having means to withdraw said latch; said shifter being directly restorable by said general operator.

68. In a decimal computing machine, the combination with a series of decimal dial wheels, of a series of racks arranged to drive said dial wheels in opposite directions, a series of carry-over racks normally ineffective, means for giving said carry-over racks predetermined movements at the passing of the associated dial wheels to zero when completing a revolution, the movement being in one direction or the other according to whether addition or subtraction is being carried on, and means for enabling said carry-over racks to transmit the movements to the next higher dial wheels to effect carry-overs, and for returning the associated carry-over racks to their intermediate position.

69. The combination with a series of decimal dial wheels, of a series of decimal racks arranged to drive said dial wheels in either direction for addition or subtraction, said racks and said dial wheels being normally out of engagement with each other, a traveling carriage, means for bringing about an engagement between said racks and said dial wheels for one direction of rotation or the other according to a predetermined set of said means, and tripping means operating from said carriage for determining the predetermined set of said first-mentioned means.

HANS HANSON.

Witnesses:
JULIUS DUCKSTINE,
GEO. W. NAYLOR.